United States Patent [19]
Sakurai et al.

[11] Patent Number: 6,062,592
[45] Date of Patent: May 16, 2000

[54] STEERING WHEEL HAVING AIR BAG MODULE

[75] Inventors: Kouji Sakurai, Inazawa; Yoshiyuki Fujita, Nagoya, both of Japan

[73] Assignee: Toyoda Gosei Co., Ltd., Aichi-ken, Japan

[21] Appl. No.: 09/103,619

[22] Filed: Jun. 24, 1998

[30] Foreign Application Priority Data

| Jun. 24, 1997 | [JP] | Japan | 9-167721 |
| Jun. 24, 1997 | [JP] | Japan | 9-167728 |
| Jun. 27, 1997 | [JP] | Japan | 9-172278 |

[51] Int. Cl.$^7$ .................................................. B60R 21/16
[52] U.S. Cl. ........................................ 280/728.2; 280/731
[58] Field of Search ............................. 280/728.2, 728.3, 280/731

[56] References Cited

U.S. PATENT DOCUMENTS 5,569,893  10/1996  Seymour ............................... 280/731

FOREIGN PATENT DOCUMENTS

| 0 488 618 | 6/1992 | European Pat. Off. . |
| 0 551 732 | 7/1993 | European Pat. Off. . |
| 0 785 107 | 7/1997 | European Pat. Off. . |
| 0 823 362 | 2/1998 | European Pat. Off. . |
| 992 05 252 U | 7/1992 | Germany . |
| 6-039658 | of 0000 | Japan . |
| 6-270816 | 9/1994 | Japan . |
| 7-025343 | 1/1995 | Japan . |
| 08225051 | 9/1996 | Japan . |
| 09 03425 | 4/1997 | Japan . |
| 2 270 657 | 3/1994 | United Kingdom . |

*Primary Examiner*—Kenneth R. Rice

[57] ABSTRACT

A steering wheel in which a ceiling portion of a pad of an air bag module has adjacent peripheral edges extending along the individual spoke portions of a steering wheel body to be positioned close to a cover layer of the individual spoke portions. Each of the adjacent peripheral portions has a push rib. A bag holder has extensions capable of abutting against the individual push ribs. Movable contacts of the individual switch bodies are individually supported by the extensions under the push ribs. Stationary contacts of the individual switch bodies are individually supported by a stationary plate which is supported in abutment by the individual spoke portion cores in the vicinity of the individual stationary contacts. The steering wheel enables the operation of a horn switch with a reduced operational load when the peripheral edge of the pad of the air bag module is depressed and retains a clear feel of arrival at the bottom. This improves the operational feel of the horn switch.

5 Claims, 23 Drawing Sheets

STEERING WHEEL HAVING AIR BAG MODULE

This application claims the benefit of foreign priority of Japanese Application Nos. 09-167721 filed Jun. 24, 1997, 09-167728 filed Jun. 24, 1997 and 09-172278 filed Jun. 27, 1997, wherein the contents of each are hereby incorporated by reference.

BACKGROUND OF THE INVENTION

1. Field of the Invention

The present invention relates to a steering wheel having an air bag module.

2. Description of Related Art

A steering wheel having an air bag module is known in the prior art, as disclosed in Unexamined Published Japanese Patent Application No. 8-225051.

In a steering wheel W0 of the Application, an air bag module MO is constructed, as shown in FIGS. 1 and 3, to include an air bag 16, an inflator 17, a pad 18 and a bag holder 19. The air bag 16 is formed into a bag shape and is folded and housed in an inflatable manner. The inflator 17 feeds the air bag 16 with an inflating gas. The pad 18 covers the folded air bag 16. The bag holder 19 holds the air bag 16, the inflator 17 and the pad 18.

In the steering wheel W0 of the prior art, moreover, horn switches 5 are assembled at the side of a steering wheel body 1. Furthermore, the air bag module MO is mounted in the steering wheel body 1 having the horn switches 5.

In the steering wheel W0, the steering wheel body 1 includes the portions of the steering wheel W0 except the air bag module MO and the horn switches 5. Thus, the steering wheel body 1 is constructed, as shown in FIG. 2, to include a ring portion R, a boss portion B, spoke portions S, a core 2 and a lower cover 4. The ring portion R is an annular portion to be gripped for the steering operation. The boss portion B is arranged at the center of the ring portion R. The plurality of spoke portions S are arranged to join the boss portion B and the ring portion R. The core 2 joins the individual portions R, B and S. The lower cover 4 covers the lower portions of the core 2 and the boss portion B. A cover layer is arranged at the ring portion R of the core 2 and the spoke portions S near the ring portion R.

When the air bag module MO is to be mounted on the steering wheel body 1, as shown in FIG. 3, the air bag module MO is brought at first into abutment against individual mounting seats 8c. Next, mounting bolts 15 are screwed through individual mounting holes 8d into mounting holes 19a, to mount the air bag module MO on the steering wheel body 1. The bag holder 19 is provided at both its right and left side faces with the mounting holes 19a made of nuts 19b. The mounting seats 8c are arranged, as shown in FIGS. 2 and 3, at the right and left sides of the steering wheel body 1.

The individual mounting bolts 15 are held in advance in holding members 12 made of a synthetic resin. These holding members 12 are mounted on the individual mounting seats 8c by means of screws.

Reference numeral 20 appearing in FIGS. 1 and 3 designate temporary mounting members made of a synthetic resin. These temporary mounting members 20 are arranged at the right and left sides of the air bag module MO. The temporary mounting members 20 are provided for mounting the air bag module MO temporarily on the steering wheel body 1 at a step before the mounting bolts 15 are fastened.

When the air bag module MO is brought into abutment against the individual mounting seats 8c, more specifically, the retaining members 20 air bag module MO temporarily mounted on the steering wheel body 1. This temporary mounting is accomplished by retaining the retaining legs 20a in the retaining holes 8b at the side of the steering wheel body 1. The reason for mounting the air bag module MO temporarily will be described below.

Specifically, the mounting of the air bag module MO on the steering wheel body 1 is accomplished by mounting the air bag module MO on the steering wheel body 1 which is mounted on the steering shaft of a vehicle. However, this steering shaft is inclined at its upper portion to the back of the vehicle. As a result, the mounting seats 8c of the steering wheel body 1 are inclined when the steering wheel body 1 is mounted on the steering shaft. If the air bag module MO is arranged on the inclined mounting seats 8a and 8c without being temporarily mounted, the air bag module MO moves out of position from the mounting seats 8c and 8c to the back of the vehicle. In order to prevent this displacement, the air bag module MO has to be temporarily mounted.

Moreover, the horn switches 5 are arranged at the right and left positions of the steering wheel body 1. Each horn switch 5 is constructed to include a stationary plate 6, a movable plate 8, two coil springs 13, and two flanged bolts 14. The stationary plate 6 is arranged at each of the right and left sides of the core 2. This stationary plate 6 is arranged to join spoke cores 2a arranged at the front and back. On the other hand, the stationary plate 6 supports two stationary contacts 7. The movable plate 8 is arranged over the stationary plate 6 and supports two movable contacts 9 corresponding to the stationary contacts 7. The coil springs 13 are arranged between the stationary plates 6 and the movable plates 8. The coil springs 13 bias the movable plates 8 upward. The flanged bolts 14 regulate the spacing of the movable plates 8 from the stationary plates 6 by allowing the movable plates 8 to move downward.

Reference numerals 10 and 11 designate insulating spacers for retaining the insulations of the flanged bolts 14 from the movable plates 8. Annular cushion rubber members (un-numbered) are arranged between the heads of the bolts 14 and the spacer 10.

Moreover, each of the movable plates 8 is provided with a root portion 8a and the mounting seat 8c. The root portion 8a is formed to extend longitudinally in the steering wheel W0. The root portion 8a is provided with the aforementioned retaining holes 8b. The mounting seat 8c is formed in the edge of the root portion 8a. The mounting seat 8c is provided with the aforementioned mounting hole 8d.

In these horn switches 5, the stationary contacts 7 are connected through the stationary plates 6 and the core 2 to the negative terminal of a horn switch activating circuit. On the other hand, the movable contacts 9 are connected through the movable plates 8 and the lead wires (not shown) with the positive terminal of the horn switch activating circuit.

When the horns are to be activated, the pad 18 is depressed to bring a predetermined movable contact 9 into contact with the stationary contact 7.

In the steering wheel W0 of the prior art, however, four switch bodies 5a are arranged at the central portion of the pad 18. Here, each switch body 5a is composed of the stationary contact 7 and the movable contact 9 of the horn switch 5, and the coil spring 13 for urging the movable contact 9 upward.

When the peripheral edge of the pad 18 outside of one switch body 5a, i.e., the peripheral edge of the pad 18 near the spoke portions S is depressed, not only are the proximate coil springs 13 compressed but so are the adjoining coil springs 13. A problem for compressing the plural coil springs 13 is that it requires a high operation load.

Especially, the four coil springs 13 support the air bag module MO having a considerable weight. As a result, the coil springs 13 are given high upward biasing forces. This further increases the operation load for activating the horn in the steering wheel WO of the prior art. As a result, the operational feel must be improved in the steering wheel WO of the prior art.

On the other hand, the pad 18 is retained on the bag holder 19. This bag holder 19 is joined at its central portion at the right and left sides to and supported by the mounting seats 8c. Moreover, the individual mounting seats 8c are arranged at the longitudinally central portion of the movable plate 8. Moreover, each movable plate 8 has the movable contacts 9 arranged at the two longitudinal ends.

Specifically, in the construction of the steering wheel WO of the prior art, the pad 18 cannot depress the movable contacts 9 directly. In order to activate the horn, therefore, it is difficult to acquire a feel of a clear contact between the contacts 7 and 9, i.e., the feel of arrival at the bottom.

This phenomenon conspicuously appears especially at the peripheral edge of the pad 18 near the spoke portions S outside of the positions of the contacts 7 and 9. Specifically, the movable contact 9 near the depressed portion contacts the stationary contact 7, and the peripheral edge of the mounting hole 19a of the bag holder 19 and the peripheral edge of the mounting seat 8c of the movable plate 8 are elastically deformed individually slightly. As a result, the depressed portion slightly moves down so that the arrival at the bottom is hard to feel.

In the steering wheel WO of the prior art, on the other hand, the horn switches 5 are mounted at the side of the steering wheel body 1 not the air bag module MO. Moreover, the horn switches 5 are small parts, whereas the steering wheel body 1 is a large part. This makes it troublesome to assemble the horn switches 5.

More specifically, each horn switch 5 is assembled in advance. When the flanged bolts 14 are screwed in the core 2a, the horn switches 5 can be assembled with the steering wheel body 1. In the assembly, however, the portions where the horn switches 5 are to be assembled are located under the boss portion B at the center of the steering wheel body 1. The portion under the boss portion B is the portion under the center defined by the annular ring portion R to be gripped when the steering wheel WO is steered. Moreover, the portion under the boss portion B is a portion which is surrounded by the lower cover 4. As a result, the ring portion R and the lower cover 4 make it difficult to screw the bolts 14 of the small-shaped horn switches 5 into the core 2a.

Moreover, a function switch such as a drive monitor switch other than the horn switches 5 is also assembled, when assembled with the steering wheel WO, in the steering wheel body 1. This makes it more difficult to assemble the various switches. During assembly, the screws or the like are liable to be lost.

In the steering wheel WO of the prior art, moreover, the temporary mounting members 20 are employed as members for mounting the air bag module MO temporarily. The temporary mounting members 20 are individually arranged at the two right and left sides of the air bag module MO. These temporary mounting members 20 are individually provided with retaining legs 20a which are spaced from each other. This spacing retains the retaining legs 20a in the two retaining holes 8b of the movable plates 8 extending in the longitudinal direction of the steering wheel WO.

Therefore, the individual temporary mounting members 20 are extended in the longitudinal direction of the steering wheel WO. As a result, the structure for mounting the air bag module MO temporarily occupies a large space to narrow the effective space in the steering wheel WO. Moreover, more materials are required for forming the temporary mounting means thereby to raise the cost for manufacturing the steering wheel WO.

SUMMARY OF THE INVENTION

A first object of the invention is to provide a steering wheel capable of improving the horn switch operating feel even when the peripheral edge of the pad of the air bag module is depressed. Specifically, the object is to provide a steering wheel which can reduce the operational load when the peripheral edge of the pad of the air bag module is depressed, and can retain a clear feel of the contact with the bottom.

A second object of the invention is to provide a steering wheel which requires an easy assembly of the horn function switches.

A third object of the invention is to provide a steering wheel which can widen the effective space in the steering wheel, even when the air bag module is temporarily mounted on the steering wheel body, and can reduce the production cost.

The first object of the invention can be achieved by a steering wheel having a steering wheel body and an air bag module. Specifically, the steering wheel body includes: an annular ring portion; a boss portion at the center of the ring portion; a plurality of spoke portions for joining the boss portion and the ring portion; a core for joining the ring portion, the boss portion and the spoke portions; and a cover layer for covering the ring portion in the core and the spoke portions in the vicinity of the ring portion. The air bag module is arranged in the steering wheel body over the boss portion and includes: an air bag module body and a horn switch.

The air bag module body includes: a folded air bag; an inflator for feeding the air bag with an inflating gas; a pad having a ceiling portion covering the folded air bag and side walls extended downward from the peripheral edge of the ceiling portion; and a bag holder for holding the air bag, the inflator and the pad. The ceiling portion of the pad has adjacent peripheral edges extending along the spoke portions individually so as to come closer to the cover layer at the individual spoke portions of the steering wheel body. Each of the adjacent peripheral edges has a push portion protruding downward. The bag holder has extensions to extend just under the individual push portions of the pad so as to abut against the same.

The horn switch is operated by depressing the pad and includes: a switch body and a stationary plate supporting the core of each of the spoke portions in abutment thereof. The switch body is arranged in plurality between the air bag module body and the steering wheel body and includes: a stationary contact; a movable contact for activating a horn when it contacts with the stationary contact; and bias means for biasing the movable contact upward to move the same apart from the stationary contact when inactive. Each of the switch bodies is arranged under the push portion. The movable contacts of the individual switch bodies are supported by the extensions. The stationary plates are supported in abutment thereof by the cores of the individual spoke portions in the vicinity of the individual stationary contacts. The stationary contacts of the individual switch bodies are supported by the stationary plates.

In the first embodiment of the steering wheel of the invention, the individual switch bodies are arranged under the adjacent peripheral edge portions of the pad ceiling. The individual adjacent peripheral edge portions are formed near the cover layer of the individual spoke portions of the steering wheel body. In short, the individual adjacent peripheral edge portions are formed to extend along the individual spoke portions. As a result, the individual switch bodies are much closer to the peripheral edges of the pad than the individual switch bodies of the steering wheel of the prior art.

As a result, when the peripheral edge of the pad in the vicinity of the spoke portions is depressed, the bias means proximate the switch body is depressed, but the compression of the adjoining bias means can be minimized. Moreover, the movable contact of the switch body can be brought into contact with the stationary contact. In the horn switch of the steering wheel of the invention, therefore, the operation load can be limited to one bias means. Thus, the operational load can be reduced in the horn switch of the invention.

On the other hand, the individual adjacent peripheral edge portions are provided with the push portions which are arranged over the movable contacts and protruded downward. The individual push portions are provided for abutment against the extensions supporting the movable contacts. When the pad is depressed at its peripheral edge, the push portions can move the movable contacts directly downward through the extensions of the bag holder.

The stationary contacts, as arranged under the individual movable contacts, are supported by the stationary plates which are supported in abutment thereof by the core of the individual spoke portions near the individual stationary contacts. As a result, the individual stationary contacts are arranged so that their downward movements are minimized.

As a result, when the peripheral edge of the pad is depressed, the push portions, which are arranged in the adjacent peripheral edges of the pad, can push the movable contacts of a predetermined switch body directly through the extensions of the bag holder into contact with the stationary contacts. Moreover, the individual stationary contacts are prevented, to the extent possible, from moving downward. Thus, the push portions will not move downward after the movable contacts come into contact with the stationary contacts. As a result, a clear feel of arrival and contact at the bottom can be achieved when the peripheral edge of the pad is depressed.

In the first embodiment of the steering wheel of the invention, therefore, when the pad peripheral edge in the air bag module is depressed, it is possible to reduce the operation load and to retain the clear feel of arrival at the bottom. As a result, the horn switch of the first invention can improve its operational feel.

In the first embodiment of the steering wheel of the present invention, the pad and the bag holder can be constructed as follows. Specifically, the pad includes: retaining grooves formed in the inner periphery of the side walls; and insertion grooves formed in the lower end faces of the side walls under the retaining grooves. Moreover, the bag holder includes: a holder plate having a retaining hook to be retained on the peripheral edges of the retaining grooves; and a backup plate arranged under the holder plate and having an insertion wall to be inserted into the insertion grooves for clamping and holding the pad side walls between itself and the bag holder. The extensions are formed on the backup plate.

In the construction described above, the pad of the air bag module can be retained with a reduced number of parts and without employing any rivets. If the backup plate is provided with the extensions for supporting the movable contacts, it is arranged outside of the holder plate. Specifically, the switch bodies have no interference with the holder plate even if they are mounted together with the movable contacts on the extensions. This makes it easy to hold the pad on the holder plate and the backup plate. In short, the assembly of the air bag module is made easier.

The second object of the invention can be achieved by a steering wheel having a steering wheel body and an air bag module. Specifically, the air bag module is constructed to be mounted on the steering wheel body and includes: an air bag module body; a horn switch; and a function switch. The horn switch is assembled with the air bag module body before being assembled with the steering wheel body. The function switch is assembled with a component of the horn switch before being assembled with the air bag module body.

In a second embodiment of the steering wheel of the present invention, the horn switches are assembled with the air bag module body when the air bag module is to be assembled. With the availability of the components of the horn switches, the horn switches are assembled in advance the function switch.

Specifically, neither the horn switches nor the function switch is directly mounted on the large parts of the steering wheel body. Thus, the function switch is assembled with the components of the horn switches. The switches require the small parts to be joined each other. On the other hand, the assembly of the horn switches requires the assembly of the horn switches with the air bag module body which is smaller than the steering wheel body.

During the assembly of the two kinds of steering wheels, it is easy to move or turn the parts such as the components of the function switch and the horn switches and the components of the air bag module body relative to each other. This makes it easy to assemble the horn switches and the function switch. Moreover, these two kinds of steering wheel, require the assembly the small parts with each other. As a result, the screws or the like to be used for the assembly can be easily found out visually, even they are lost. This makes it easy to manage the parts such as the screws.

As a result, the second steering wheel of the invention can be simply assembled because it is easy to manage the parts such as the screws and to assemble the horn switches and the function switch.

In the second steering wheel of the invention, the horn switches can be constructed as follows. Specifically, the horn switch includes: a stationary plate adapted to be mounted on the steering wheel body; a function switch, for supporting a stationary contact; a movable plate arranged over the stationary plate and adapted to be mounted on the air bag module body, for supporting a movable contact corresponding to the stationary contact; bias means arranged between the stationary plate and the movable plate, for biasing the movable plate upward; and a regulate means for regulating the spacing of the movable plate from the stationary plate, by allowing the movable plate to move downward. The regulate means includes a stepped bolt. The stepped bolt includes: a head having a larger diameter than that of a mounting hole formed in the stationary plate; and a stem extended upward from the head and adapted to be inserted into the mounting hole. The stem includes: a diametrically larger portion at a lower side; and a diametrically smaller portion extending upward with a smaller diameter than that of the diametrically larger portion and externally threaded to be screwed in a threaded hole formed in the movable plate. When the horn switch is assembled, the movable plate is mounted on the air bag module body, and the stationary plate, as assembled with the function switch, is arranged under the movable plate while interposing the stationary contact, the movable contact and the urge means between itself and the movable plate. The stepped bolt is screwed from the lower face of the stationary plate through the mounting hole into the threaded hole of the movable plate, to bring the head into abutment against the peripheral edge of the mounting hole and the end face of the diametrically larger portion into abutment against the peripheral edge of the threaded hole. Thus, the horn switch and the function switch are assembled with the air bag module body.

In the construction described above, the horn switches can be assembled by screwing the stepped bolts into the threaded holes of the movable plate. Simultaneously, the horn switches can be assembled with the air bag module body.

As a result, the stepped bolts can play a role to assemble the horn switches by themselves and with the air bag module body. In short, the stepped bolts can reduce the number of parts composing the air bag module and the number of steps in assembling the air bag module.

The third object of the invention can be achieved by the steering wheel having a steering wheel body and an air bag module. The steering wheel body includes: a center boss portion; at total of four spoke portions arranged at the front and back and at the right and left sides; and mounting seats individually arranged between the spoke portions at the front and back and at the right and left sides and adapted to be individually brought into abutment against the right and left side face portions of the air bag module. Holding members are individually mounted on the mounting seats. Mounting bolts for mounting the air bag module on the mounting seats of the steering wheel body are individually held in the holding members. The air bag module has one retaining hole in the vicinity of the screwing portion of each of the mounting bolts. The individual holding members have retaining pawls to be retained on the peripheral edges of the corresponding retaining holes. The cores of the individual spoke portions have support portions for supporting the lower face of the air bag module. When the air bag module is to be mounted in upper side of the boss portion in the steering wheel body, the air bag module is arranged at the individual mounting seats while being supported by the individual support portions of the individual spoke portions, and the individual retaining pawls are retained on the peripheral edges of the corresponding retaining holes, so that the air bag module is temporarily mounted on the steering wheel body.

In the third embodiment of the steering wheel of the present invention, when the air bag module is mounted on the steering wheel body, the air bag module is arranged at first on the individual mounting seats while being supported by the individual support portions of the individual spoke portions. Moreover, the retaining pawls are retained in the corresponding retaining holes. Then, the air bag module can be temporarily mounted on the steering wheel body.

After the temporary mounting of the air bag module, the stepped bolts, as held in advance on the individual holding members, are screwed through the right and left mounting seats into the air bag module. Then, the air bag module can be mounted on the steering wheel body.

In the steering wheel of the invention, the members for mounting the air bag module temporarily are exemplified by retaining pawls. These retaining pawls extend from the individual holding members holding the mounting bolts. Moreover, the retaining pawls are provided to correspond to the retaining holes which are individually provided at the right and left sides of the air bag module. This prevents the retaining members from becoming bulky. As a result, it is possible to widen the effective space in the steering wheel. Moreover, the retaining pawls can be formed merely by integrating them with the existing holding members. Even if the retaining pawls are formed, no substantial increase occurs in the cost for the materials. Thus, the cost for manufacturing the steering wheel can be lowered.

Moreover, the temporary mounted state of the air bag module is established by the individual retaining pawls at the right and left sides of the air bag module. However, the air bag module in the temporary mounted state is supported in abutment individually at the right and left of the individual support portions of the four spoke cores arranged at the right and left sides in the longitudinal direction. The portions to be supported in abutment are located at two portions at the front and back of the temporary mounted portions (or the peripheral edges of the retaining holes). Moreover, the air bag module can be temporarily mounted stably without any rotation because it is supported in advance at the front and back and at the right and left sides.

In the third embodiment of the steering wheel of the present invention, the air bag module can be temporarily mounted stably on the steering wheel body. Moreover, the space for the means for mounting the air bag module temporarily can be minimized to widen the effective space in the steering wheel. Furthermore, the production cost can be lowered.

In the third embodiment of the steering wheel of the invention, the air bag module can be constructed as follows. Specifically, the air bag module is constructed by assembling it with a plurality of horn switches. Each of the horn switches includes: a stationary plate for supporting a stationary contact; a movable plate arranged over the stationary plate and adapted to be mounted on an air bag module body and supporting the movable contact corresponding to the stationary contact; bias means arranged between the stationary plate and the movable plate for urging the movable plate upward; and regulate means for regulating the spacing of the movable plate from the stationary plate by allowing the movable plate to move downward. The stationary plate includes: the retaining holes; mounting portions adapted to be fixed on the mounting seats by screwing the mounting bolts; and abutments adapted to be supported by the support portions of the spoke portions.

In the construction described above, the plural horn switches are assembled with the air bag module. Moreover, the predetermined stationary plate for supporting the stationary contacts is provided with the retaining holes to be retained on the retaining pawls of the holding members, the mounting portions for screwing the mounting bolts thereinto, and the abutment to be supported by the support portions of the spoke core. In short, the plural horn switches are mounted in advance at the side of the air bag module. Thus, the horn switches can be arranged on the steering wheel merely by mounting the air bag module on the steering wheel body. As a result, it is easy to assemble the plural horn switches with the steering wheel.

DESCRIPTION OF THE PREFERRED EMBODIMENTS

The invention will be described in connection with its embodiments with reference to the accompanying drawings. However, the invention is not be limited to the described embodiments. All modifications in the elements of the claims or the equivalents of the elements should be included in the scope of the claims.

Figure 1:
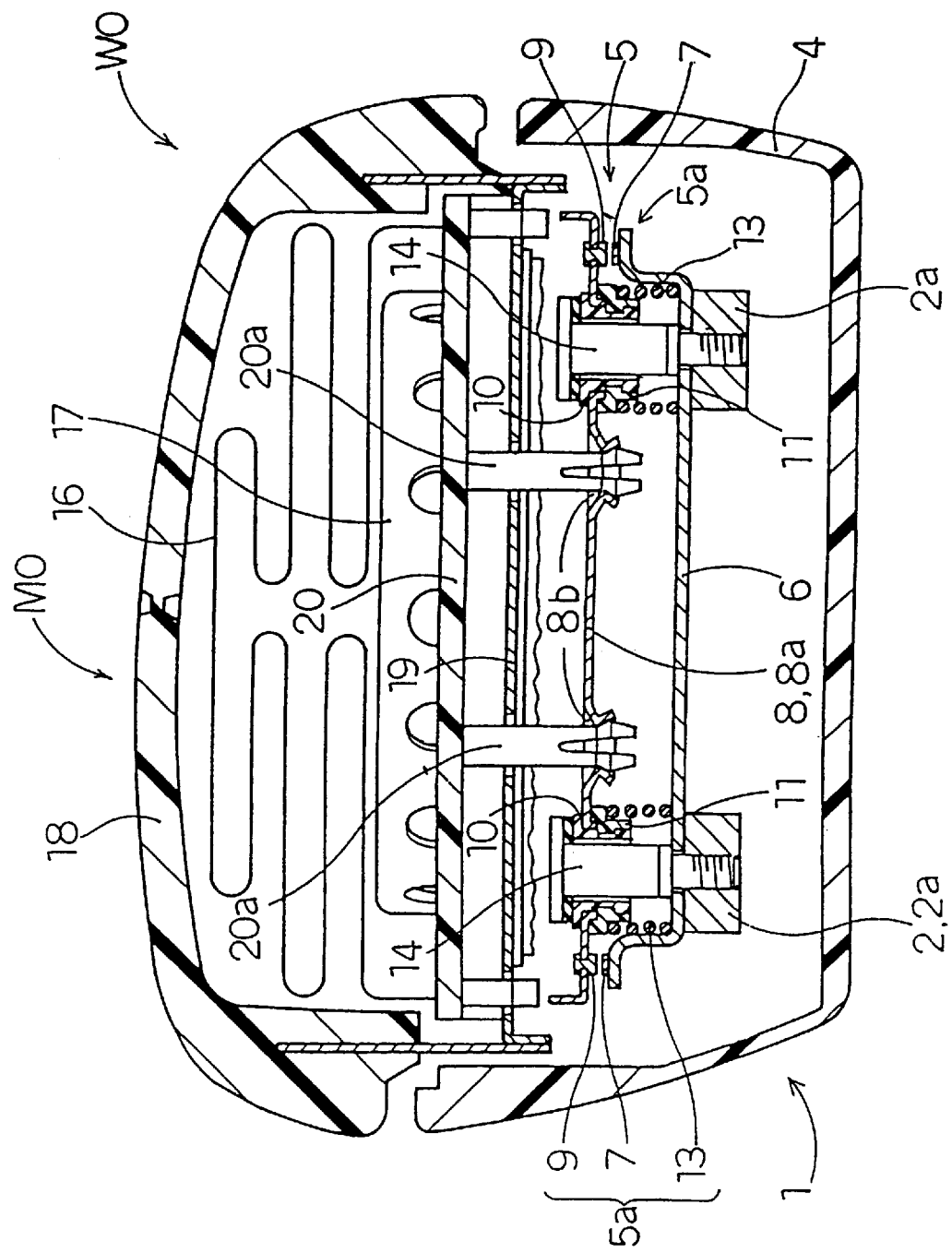
FIG. 1 is a longitudinal section showing a steering wheel of the prior art and shows a portion I—I of FIG. 2.
Figure 2:
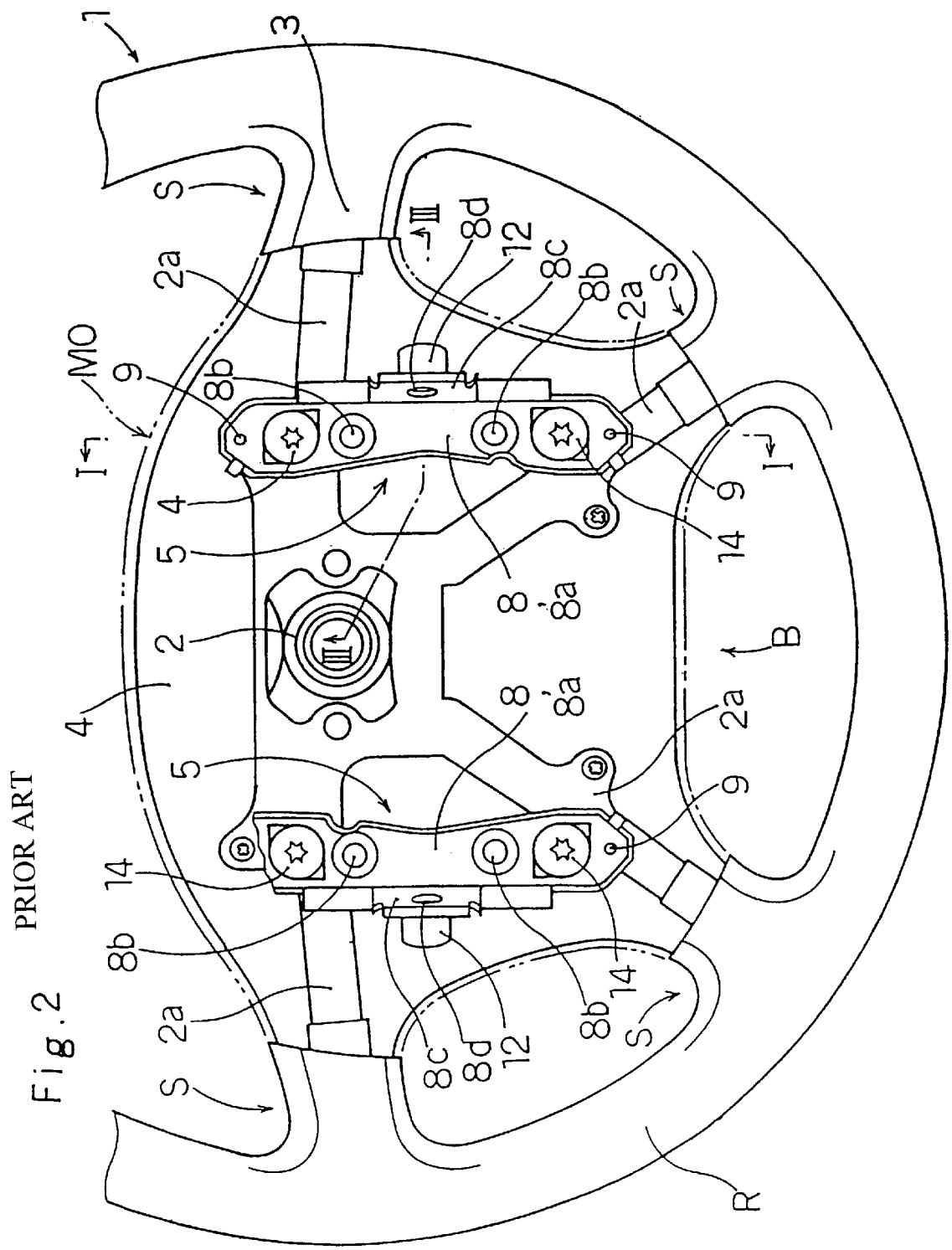
FIG. 2 is a top plan view showing the steering wheel body of the prior art.
Figure 3:
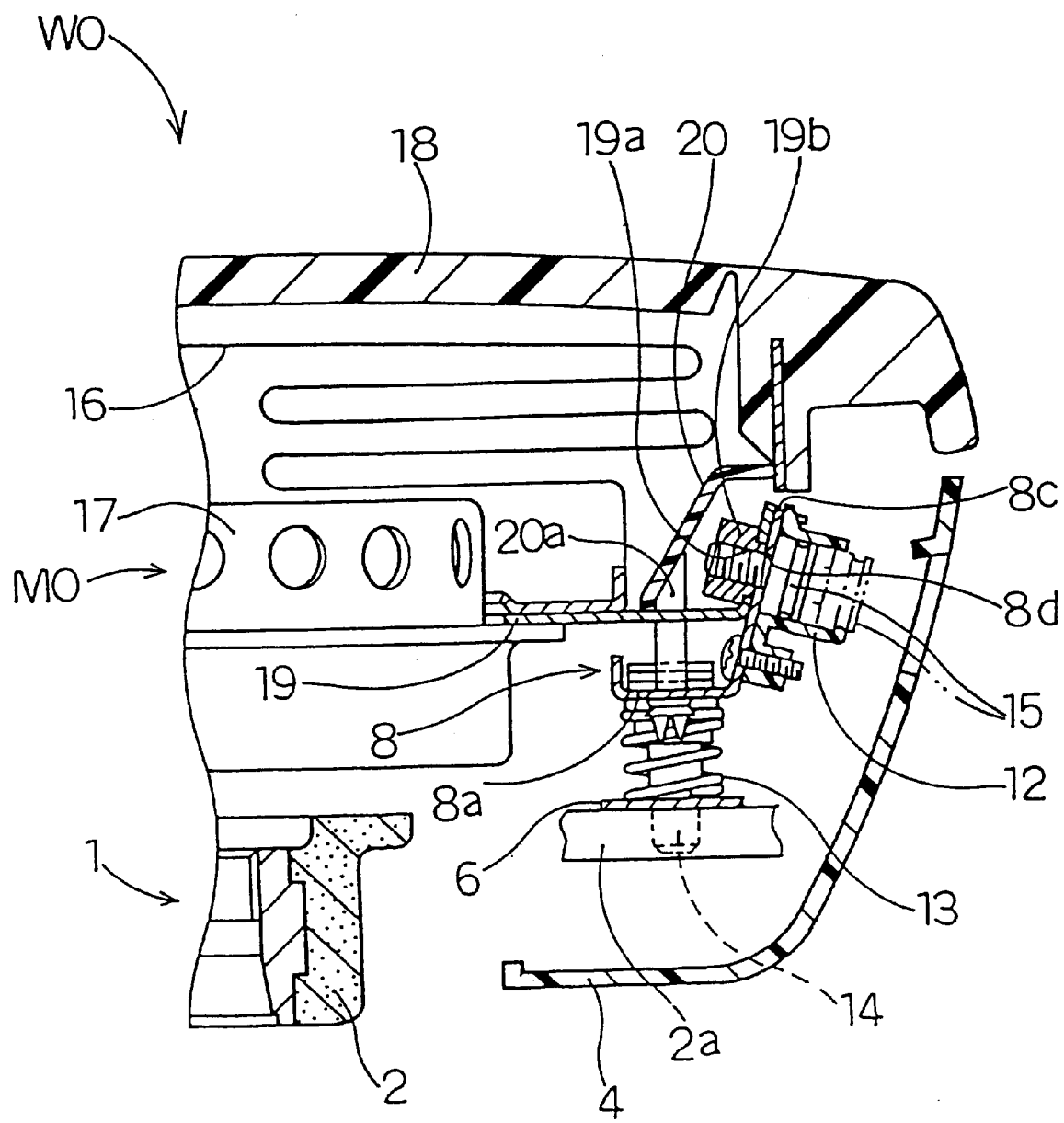
FIG. 3 is a longitudinal section showing the steering wheel of the prior art and shows a portion III—III of FIG. 2.
Figure 4:
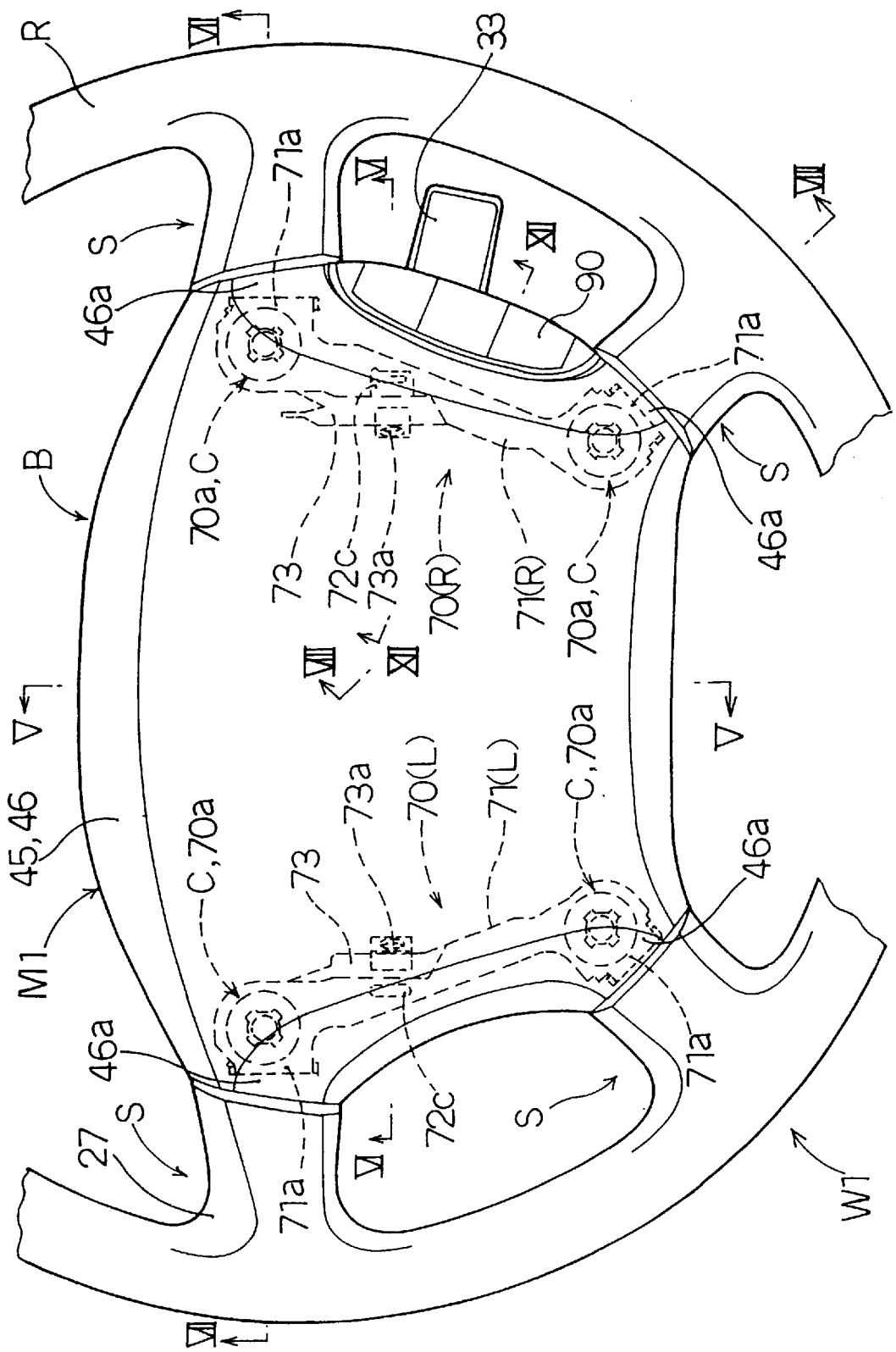
FIG. 4 is a top plan view showing a steering wheel according to a first embodiment of the invention.

A steering wheel W1 is constructed, as shown in FIG. 4, to include a steering wheel body 21 and an air bag module M1. The air bag module M1 is arranged in the upper portion of a boss portion B at the center of the steering wheel body 21.

The steering wheel body 21 is constructed, as shown in FIG. 4 and FIGS. 7 to 9, to include a ring portion R, the boss portion B and a spoke portion S. The ring portion R is formed into an annular shape to be gripped while steering by an operator. The boss portion B is arranged at the center of the ring portion R. The spoke portion S is composed of four portions arranged to join the boss portion B and the ring portion R. Moreover, the steering wheel body 21 is equipped with a core 22. This core 22 is composed of a ring core 23, a boss core 24 and spoke cores 25 (25F and 25B) and is arranged to join the individual portions of the ring portion R, the boss portion B and the spoke portion S. The ring core 23 and the individual spoke cores 25 at the ring core 23 are covered with a cover layer 27 made of a synthetic resin such as urethane. A boss core 24 is composed of a boss 24a and a cover portion 24b. The boss 24a is a portion to be joined to the steering shaft (not-shown) and is made of steel. The cover portion 24b is made of an aluminum alloy and is arranged to cover the boss 24a. The cover portion 24b is formed integrally with the spoke cores 25. The ring core 23 is made of a steel pipe and joined to the spoke cores 25 while being covered with the end portions of the spoke cores 25.

Figure 7:
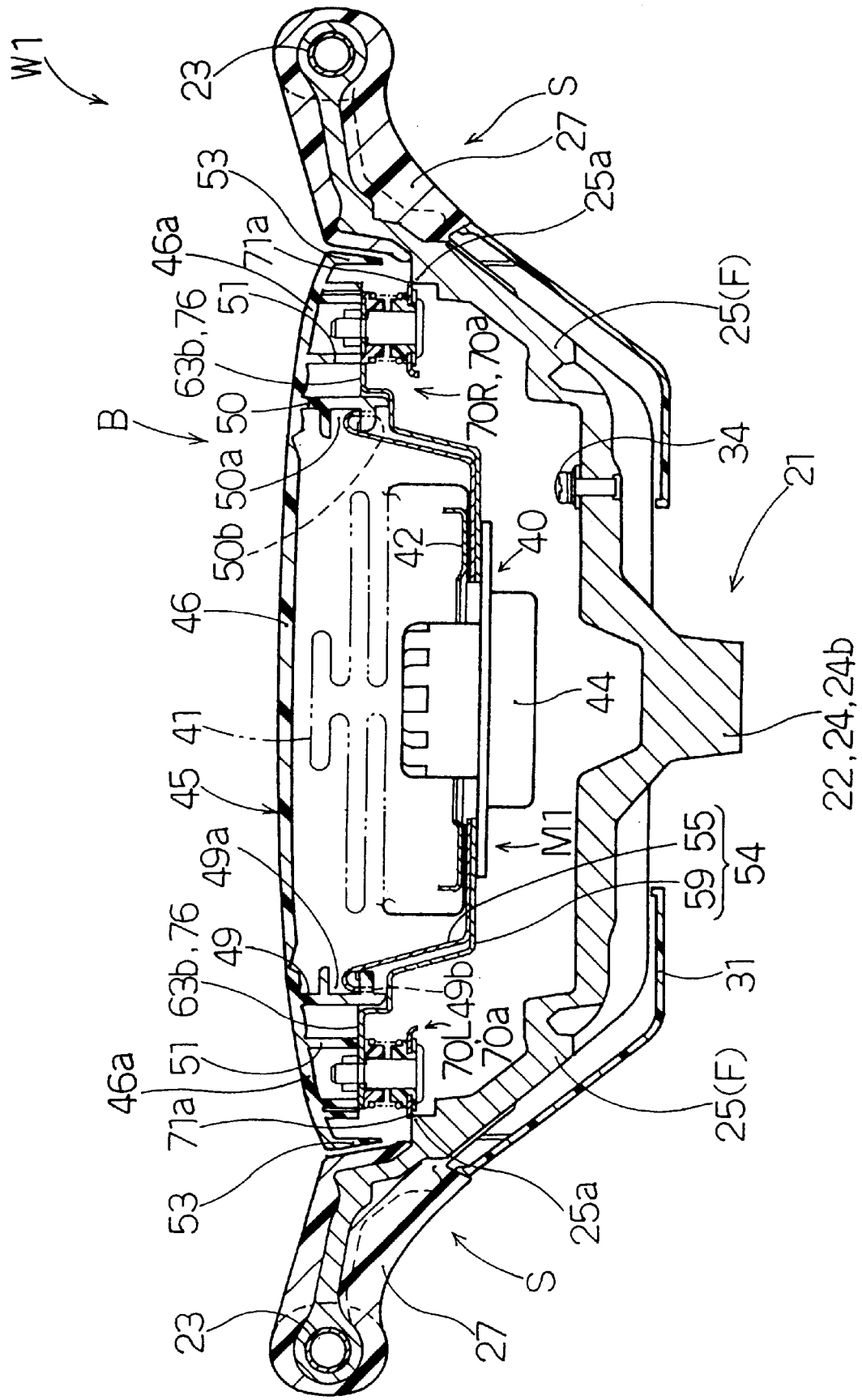
FIG. 7 is a longitudinal section of the first embodiment and shows a portion VII—VII of FIG. 4.
Figure 8:
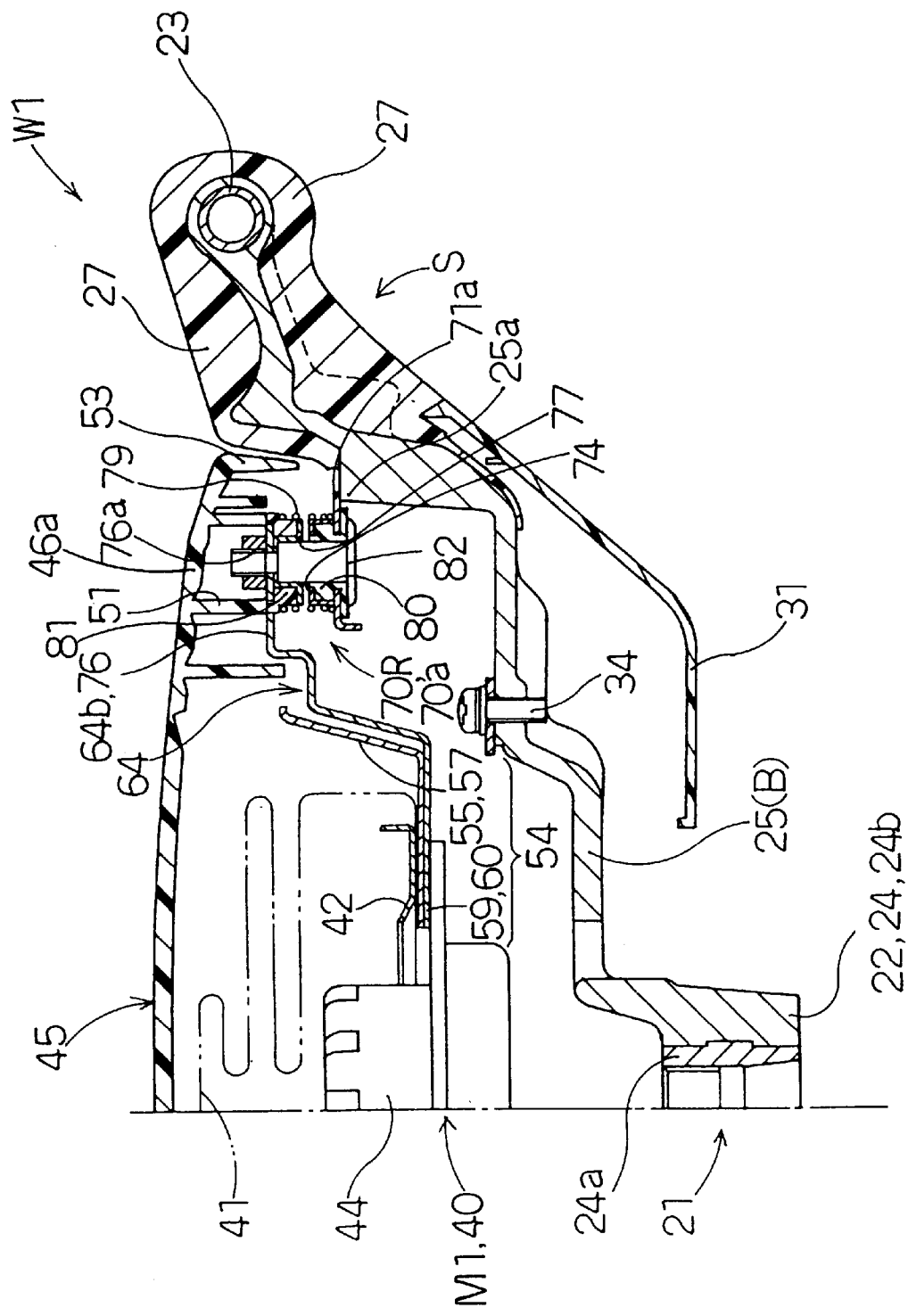
FIG. 8 is a longitudinal section of the first embodiment and shows a portion VIII—VIII of FIG. 4.
Figure 9:
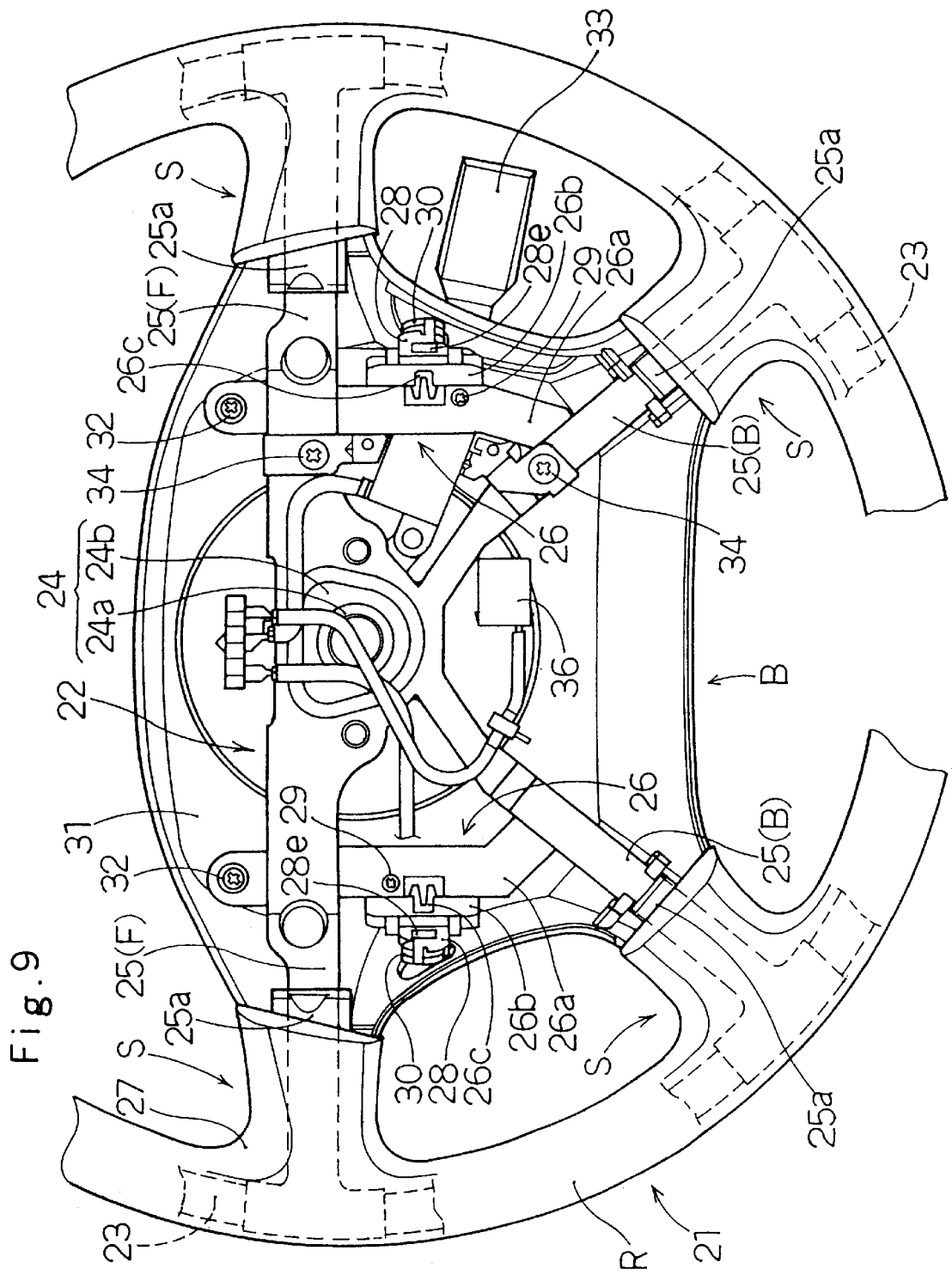
FIG. 9 is a top plan view showing a steering wheel body of the first embodiment.

Each spoke core 25 is equipped, as shown in FIGS. 7 to 9, with a support portion 25a in the vicinity of the cover layer 27 at its intermediate portion. The support portion 25a protrudes upward to have an upper face generally at a right angle with respect to the axial direction of the boss 24a. Each support portion 25a abuts against and supports the lower face of an abutment 71a of a stationary plate 71 (described below).

Figure 6:
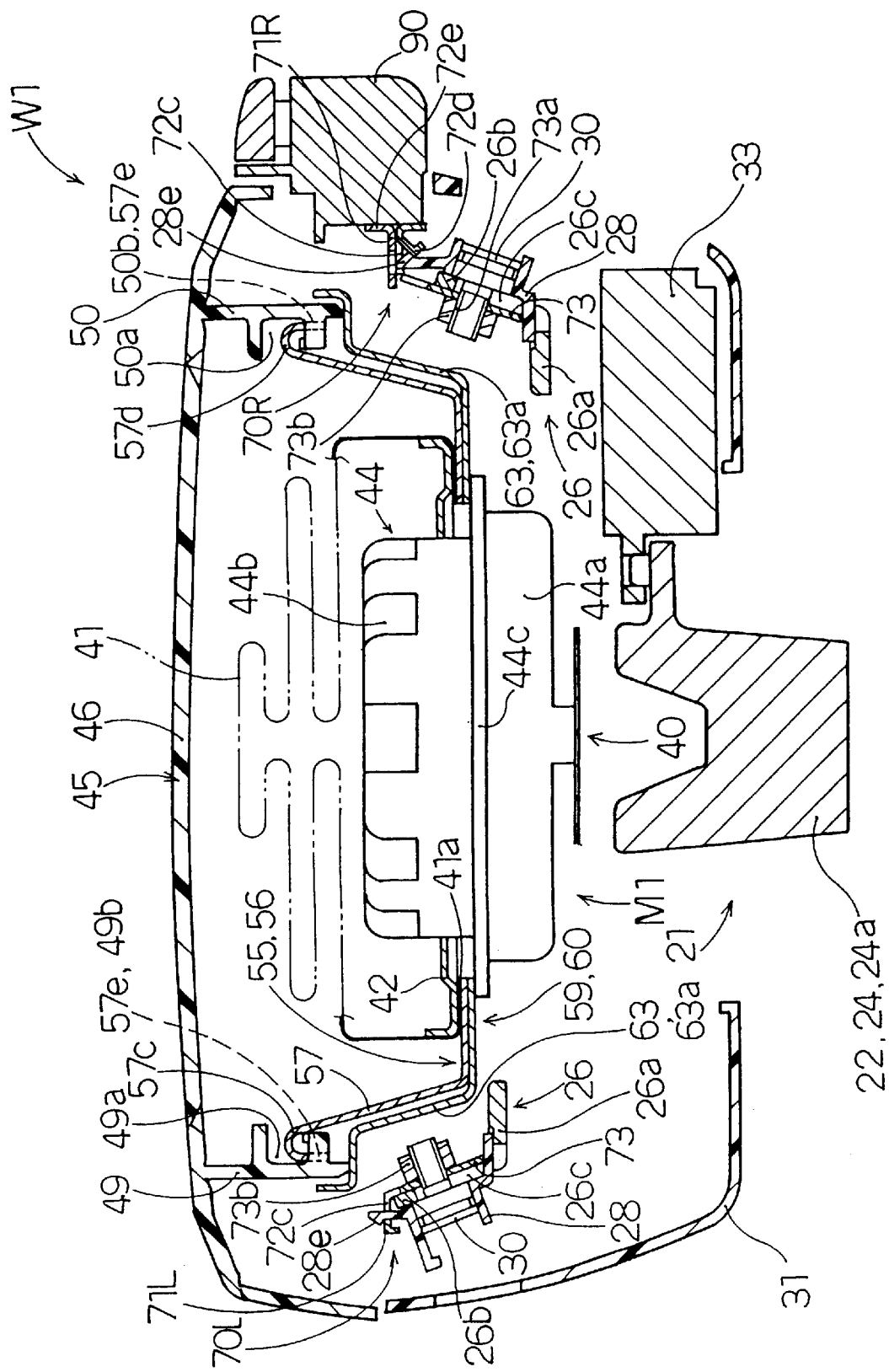
FIG. 6 is a longitudinal section of the first embodiment and shows a portion VI—VI of FIG. 4.
Figure 15:
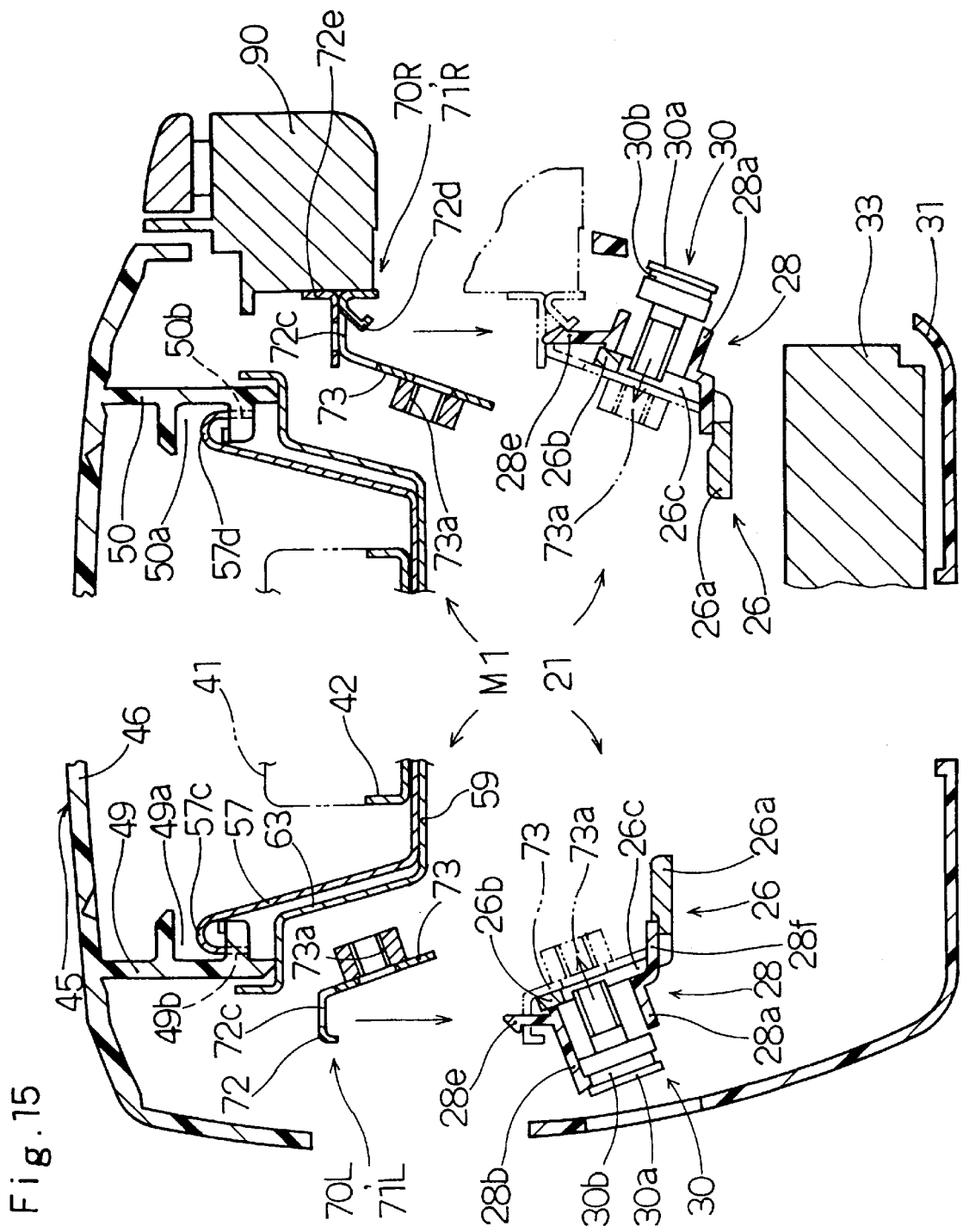
FIG. 15 is a section showing a state before the air bag module of the first embodiment is temporarily mounted.

At the right and left sides of the core 22, there are disposed mounting seats 26 for mounting the air bag module M1. Each mounting seat 26 is arranged to join the front and back spoke cores 25F and 25B. Moreover, each mounting seat 26 is composed, as shown in FIGS. 6 and 9, of a joint plate 26a and a mounting plate 26b. The joint plate 26a is arranged in a direction to intersect the axial direction of the boss 24a at a right angle. The mounting plate 26b is arranged to extend obliquely upward and outward from the outer edge of the joint plate 26a. Each mounting seat 26 is provided with a mounting hole 26c extending from the mounting plate 26b to the joint plate 26a. Into the mounting hole 26c, there is inserted a mounting bolt 30 for mounting an air bag module M1. Here, each mounting bolt 30 is temporarily held by a holding member 28 made of a synthetic resin such as polyacetal, as shown in FIGS. 9 and 15, before the air bag module M1 is mounted. The holding member 28 is mounted on the joint plate 26a by means of screws 29.

Figure 13:
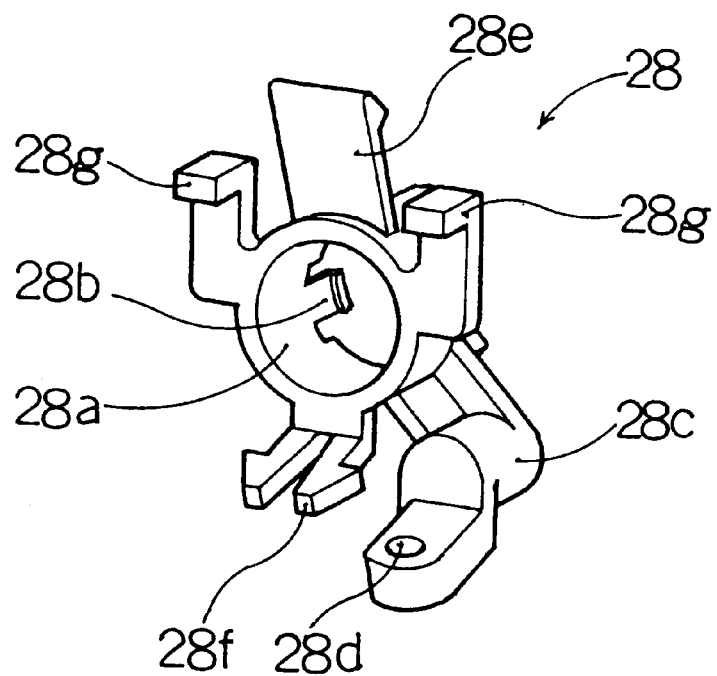
FIG. 13 is a perspective view showing a holding member to be used in the first embodiment.
Figure 14:
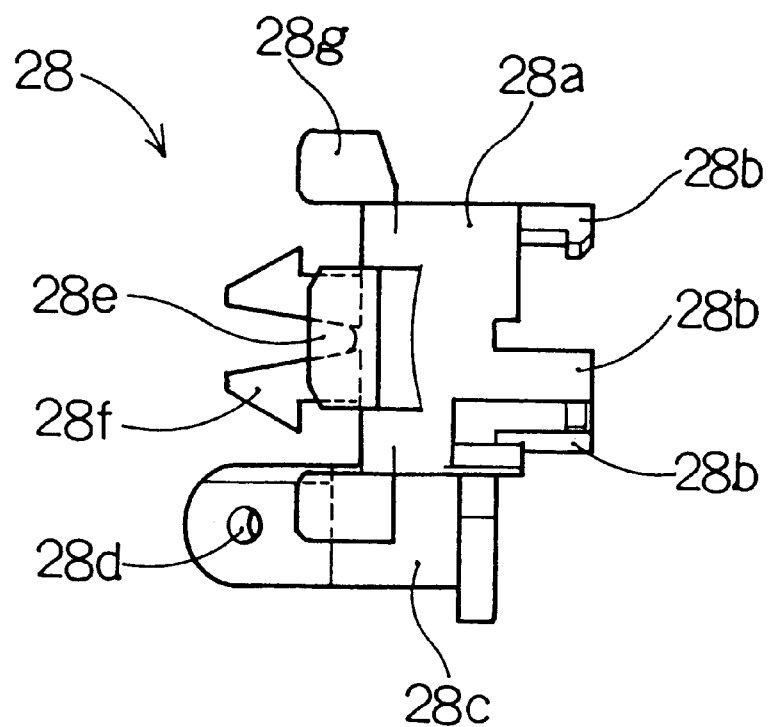
FIG. 14 is a top plan view showing the first holding member.

The holding member 28 is provided, as shown in FIGS. 13 and 14, with a cylindrical portion 28a, three hook portions 28b and an mounting arm 28c. The cylindrical portion 28a is a portion for fitting the mounting bolt 30 therein. The three hook portions 28b protrude from the end face of the cylindrical portion 28a. The hook portions 28b are fitted in the annular groove 30b of the head 30a of the mounting bold 30 to hold the mounting bolt 30. The mounting arm 28c protrudes from the lower side outer circumference of the cylindrical portion 28a at the side of the hook portions 28b.

The mounting arm 28c is provided with a mounting hole 28c into which the screw 29 is to be driven. On the other hand, the holding member 28 is provided on the upper side outer circumference of the cylindrical portion 28a with a retaining pawl 28e projecting upward. The holding member 28 is further include a retaining clip portion 28f and two hook portions 28g. The retaining clip portion 28f is arranged at the side of the cylindrical portion 28a apart from the hook portions 28b and is retained on the circumferential edge of the mounting hole 26c of the mounting seat 26. The two hook portions 28g are retained on the upper end of the mounting plate 26b of the mounting seat 26.

The holding members 28 are mounted and fixed on the individual mounting seats 26 of the steering wheel body 21 in the following manner. At first, the retaining clip portions 28f are retained on the circumferential edges of the mounting holes 26c. The two hook portions 28b are hooked on the upper edges of the mounting plates 26b. Moreover, the screws 29, as inserted from above the joint plates 26a, are driven into the mounting holes 28d. As a result, the holding member are mounted and fixed on the individual mounting seats 26. Thus, the individual retaining pawls 28e are retained on the circumferential edges of later-described retaining holes 72c to fix the air bag module M1 temporarily.

On the other hand, the steering wheel body 21 is provided with a lower cover 31 made of a synthetic resin and a constant-speed device switch 33. The lower cover 31 is attached to the core 22 by means of screws 32 to cover below the boss portion B. The constant-speed device switch 33 is mounted on the spoke core 25 or the lower cover 31 by screws 34. The steering wheel body 21 is further provided with a connector 36 and another connector (not shown). The connectors 36 and these connectors are connected with connectors 67 and 85, as will be described hereinafter.

The air bag module M1 is constructed, as shown in FIGS. 6 and 7, to include an air bag module body 40, two horn switches 70 (70R and 70L) and a drive monitor switch 90 acting as a function switch. The horn switches 70R and 70L are positioned at the two right and left sides of the air bag module body 40 and are arranged between the body 40 and the steering wheel body 21. The drive monitor switch 90 is arranged at the righthand edge of the air bag module body 40.

This air bag module body 40 is constructed, as shown in FIGS. 5 to 8 and FIGS. 10 to 12, to include an air bag 41, an inflator 44, a pad 45 and a bag holder 54. The air bag 41 is formed into such a bag shape as folded in an inflatable manner. The inflator 44 feeds the air bag 41 with an inflating gas. The pad 45 covers the folded air bag 41. The bag holder 54 holds the air bag 41, the inflator 44 and the pad 45. The bag holder 54 is composed, in this embodiment, of a holder plate 55 and a backup plate 59.

The inflator 44 is composed of a body portion 44a and a flanged portion 44c. The body portion 44a is formed generally into a column shape having gas exits 44b at its upper portion. The flanged portion 44c protrudes from the outer circumference of the body portion 44a.

The pad 45 is made of a synthetic resin and is composed of a ceiling portion 46 and four side walls 47, 48, 49 and 50, as shown in FIGS. 5 to 8, FIGS. 10 to 12 and FIG. 16. The ceiling portion 46 is broken at its predetermined portion when the air bag 41 is inflated. The four side walls 47, 48, 49 and 50 extend downward from the vicinity of the outer peripheral edge of the ceiling portion 46.

The side walls 47 and 48 confront each other in the longitudinal direction and have retaining grooves 47a and 48a in their respective inner peripheries. The side walls 47 and 48 further have insertion grooves 47b and 48b in their respective end faces. In the retaining grooves 47a and 48a, there are inserted and retained therein retaining hooks 57a and 57b (described below) of the holder plate 55. Into the insertion grooves 47b and 48b, there are inserted the insertion walls 61 and 62 (described below) of the backup plate 59.

Figure 16:
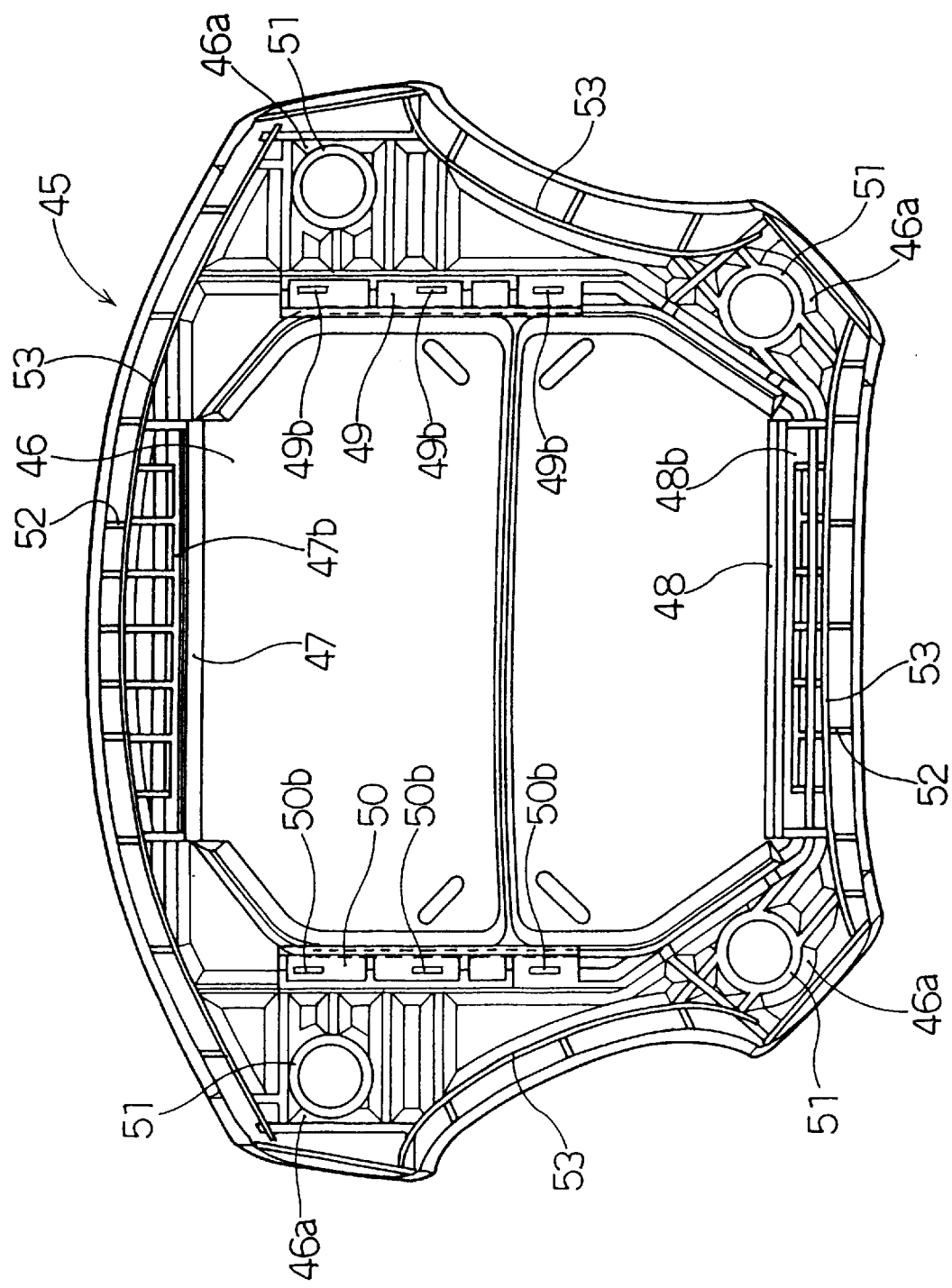
FIG. 16 is a bottom view showing a pad to be used in an air bag module body of the first embodiment.
Figure 17:
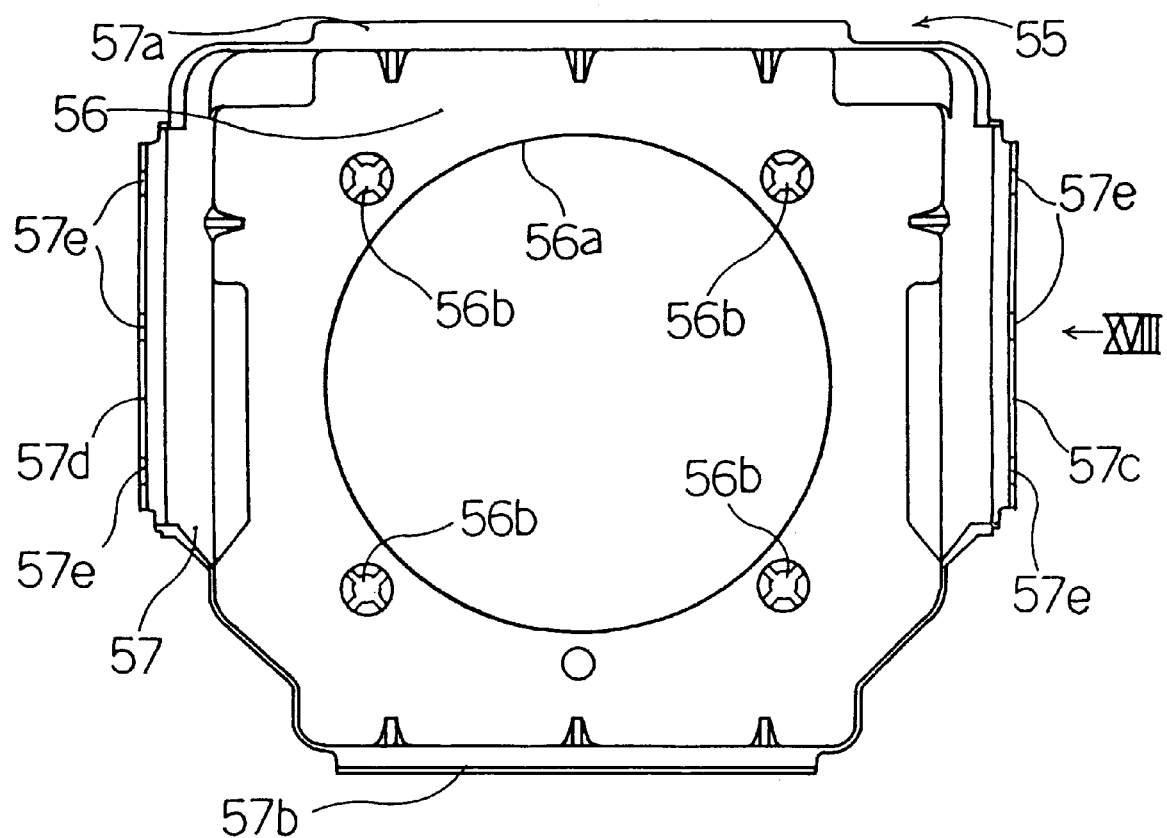
FIG. 17 is a bottom view of a bag holder to be used in the air bag module body of the first embodiment.
Figure 18:
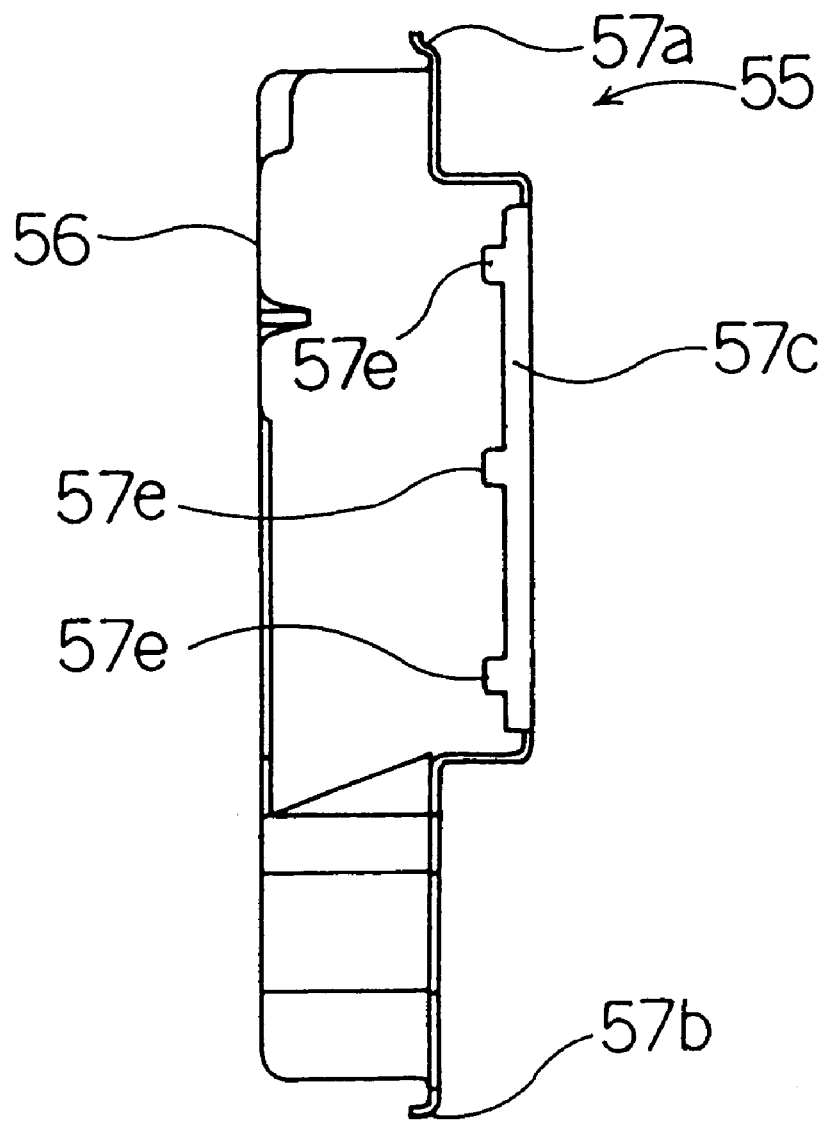
FIG. 18 is a view taken in the direction of arrow XVIII of FIG. 17.

The side walls 49 and 50 confront each other in the transverse direction and have retaining grooves 49a and 50a in their respective peripheries. In the retaining grooves 49a and 50a, there are inserted and retained the retaining hooks 57c and 57d (described below) of the holder plate 55. The side walls 49 and 50 further have three retaining holes 49b and 50b individually in the peripheries of the lower portions of the retaining grooves 49a and 50a, as shown in FIGS. 7 and 16. In the individual retaining holes 49b and 50b, there are inserted and retained projections 57e. Three projections 57e are provided on the leading end of each of the retaining hook 57c and 57d of the holder plate 55.

In the portions of the ceiling portion 46 outside of the side walls 47, 48, 49 and 50, as shown in FIGS. 4, 7, 8 and 16, there are formed four adjacent peripheral edges 46a. Each of the adjacent peripheral edges 46a is formed to extend along each spoke core 25 adjacent to the cover layer 27 in each spoke portion S of the steering wheel body 21. On the lower face of each adjacent peripheral edge 46a, as shown in FIGS. 7, 8 and 16, there is formed a cylindrical push rib 51 acting as a push portion. These push ribs 51 abut against the extensions 63b and 64b of the support members 63 and 64 (described below) in the backup plate 59.

Figure 5:
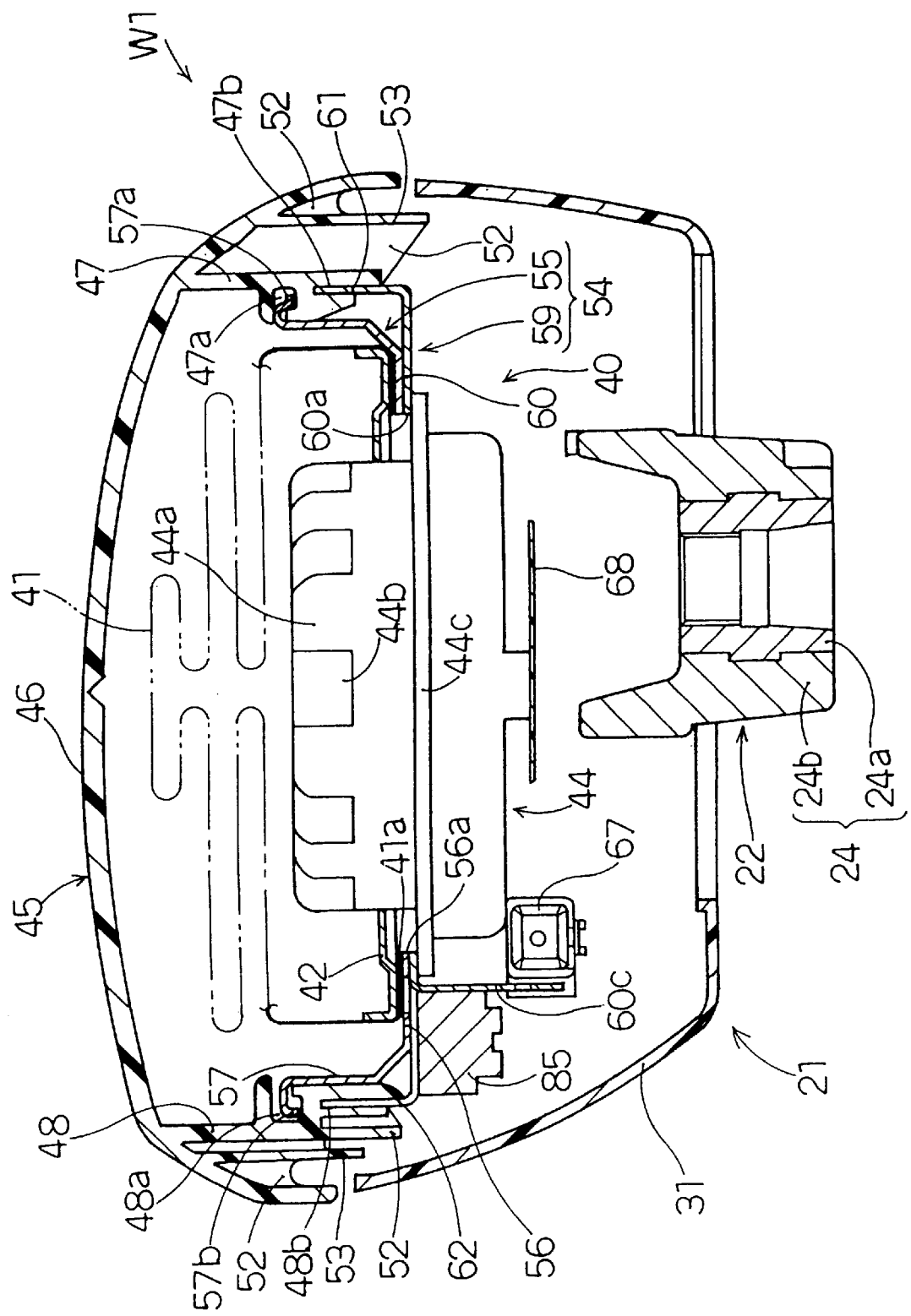
FIG. 5 is a longitudinal section of the first embodiment and shows a portion V—V of FIG. 4.

On the lower face of the ceiling portion 46, as shown in FIGS. 5 and 16, there are formed reinforcing ribs 52 and shielding ribs 53. These shielding ribs 53 shield the gaps between the ceiling portion 46 and the lower cover 31.

The holder plate 55 is made of a sheet metal and is composed of a bottom 56 and a side wall 57, as shown in FIGS. 5 to 7 and FIGS. 17 and 18. The bottom 56 is formed into a generally rectangular shape and has at its center an insertion hole 56a, into which the inflator body 44a can be inserted from below. The side wall 57 is extended in a generally square shape from the outer peripheral edge of the bottom 56. This bottom 56 has four through-holes 56b in the peripheral edge of the insertion hole 56a. Into each through hole 56b, there is inserted the bolt 42a of the retainer 42 (described below). The retaining hooks 57a and 57b are formed on the front and back edges at the upper end of the side wall 57 to be inverted from each other. Likewise, the retaining hooks 57c and 57d are formed on the right and left edges at the upper end of the side wall 57 to be inverted from each other. Three projections 57e are formed at the leading end of each of the retaining hooks 57c and 57d.

The backup plate 59 is made of a sheet metal and is composed of a bottom 60 and the insertion walls 61 and 62, as shown in FIGS. 5 to 7 and FIGS. 19 and 20. The bottom 60 is formed into a generally rectangular shape and has at its center an insertion hole 60a into which the inflator body 44a can be inserted from below. The insertion walls 61 and 62 extend upward from the front and back peripheral edges of the bottom 60. This bottom 60 has four through holes 60b in the peripheral edge of the insertion hole 60a. The bolts 42a of the retainer 42 (described below) are inserted into the individual through holes 60b.

In the vicinity of the right front and left front sides in the peripheral edge of the bottom 60 are formed the support members 63. Each of the support members 63 has a vertical plate 63a and the extension 63b. The vertical plate 63a extends upward from the bottom 60. This vertical plate 63a has a step. The extension 63b is bent from the upper end of the vertical plate 63a and extends outward. Near the right and left back sides of the peripheral edges of the bottom 60, on the other hand, there are individually formed the support members 64. Each of these support members 64 is composed of a vertical plate 64a and the extension 64b. The vertical plate 64a extends upward from the bottom 60. The extension 64b is bent from the upper end of the vertical plate 64a and extends outward.

Figure 10:
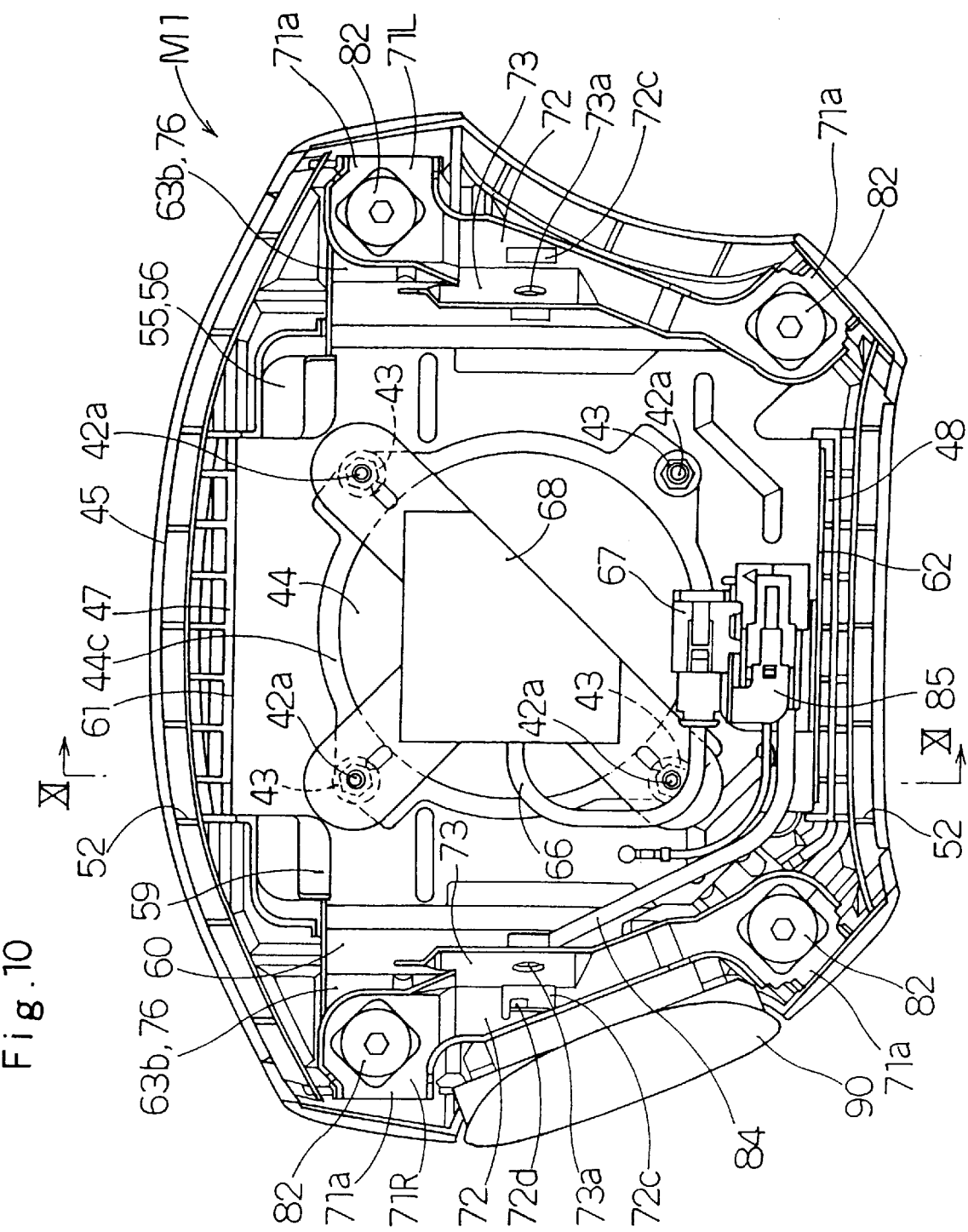
FIG. 10 is a bottom view showing an air bag module of the first embodiment.

The extensions 63b and 64b of those support members 63 and 64 are extended below the push ribs 51 of the pad 45. Moreover, the extensions 63b and 64b are a movable plate 76 for supporting each movable contact 77 of the horn switch 70. At the bottom 60 of the backup plate 59, as shown in FIG. 10, there is connected a lead wire 84. This lead wire 84 connects each movable plate 76 with the positive side of the horn activating circuit.

Figure 19:
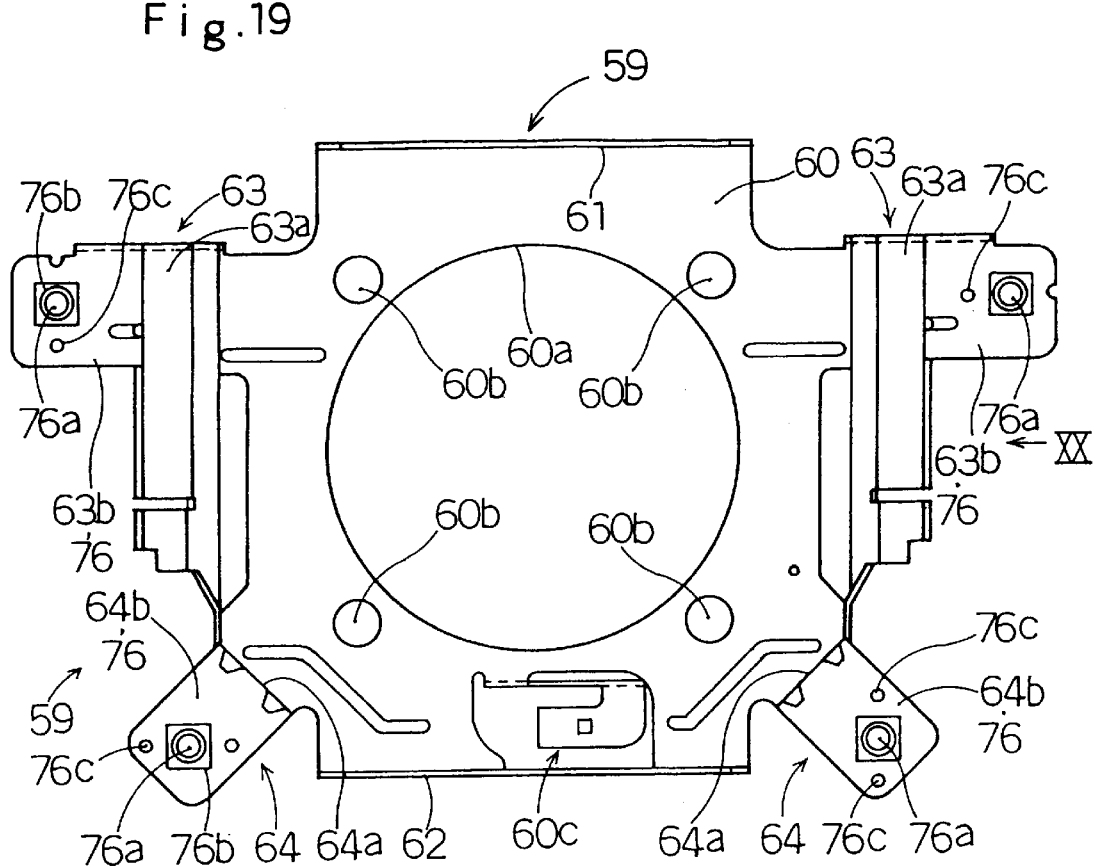
FIG. 19 is a top plan view showing a backup plate to be used in the air bag module body of the first embodiment.
Figure 20:
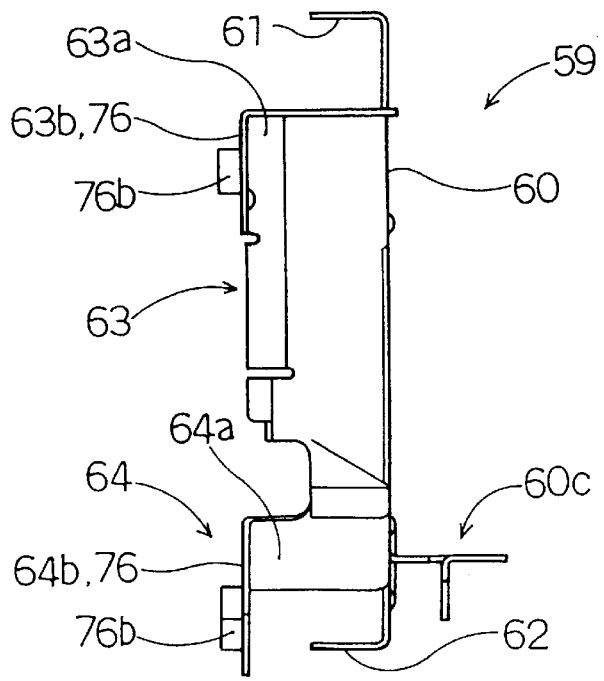
FIG. 20 is a view taken in the direction of arrow XX of FIG. 19.

At the bottom 60 of the backup plate 59, there is also formed a bracket portion 60c which extends downward (as shown in FIGS. 5, 19 and 20). This bracket portion 60c retains the connector 85 of the lead wire 84 and the connector 67 of a lead wire 66 leading from the inflator 44.

Figure 11:
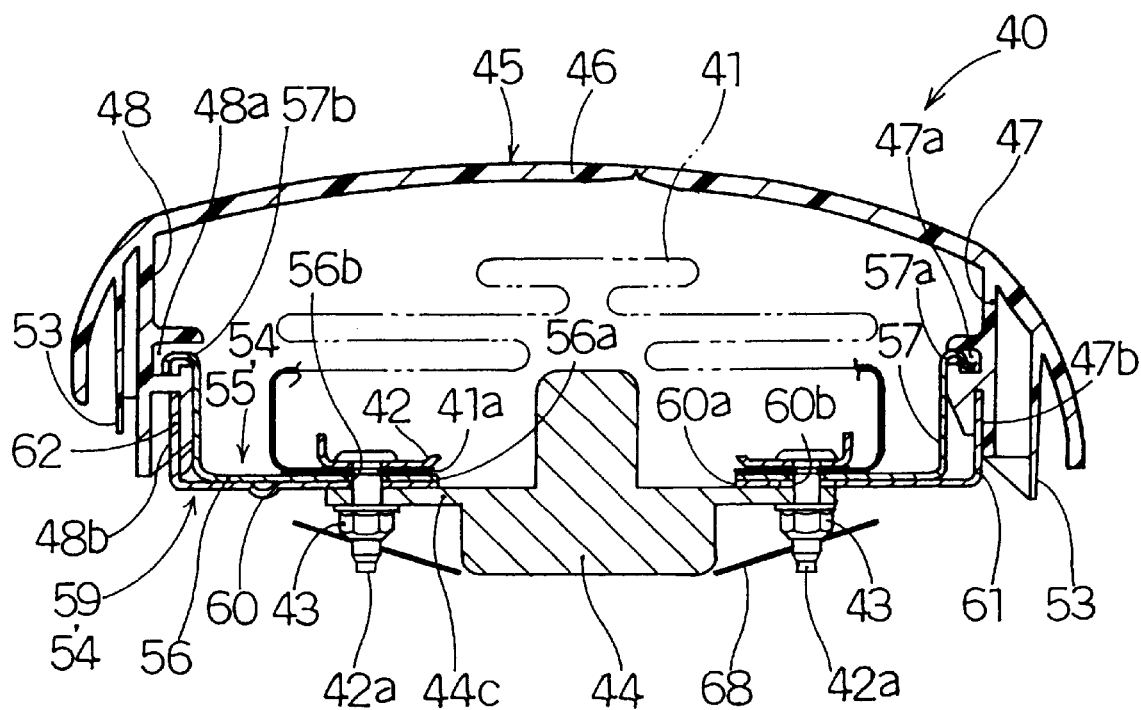
FIG. 11 is a longitudinal section showing the first air bag module and shows a portion XI—XI of FIG. 10.
Figure 12:
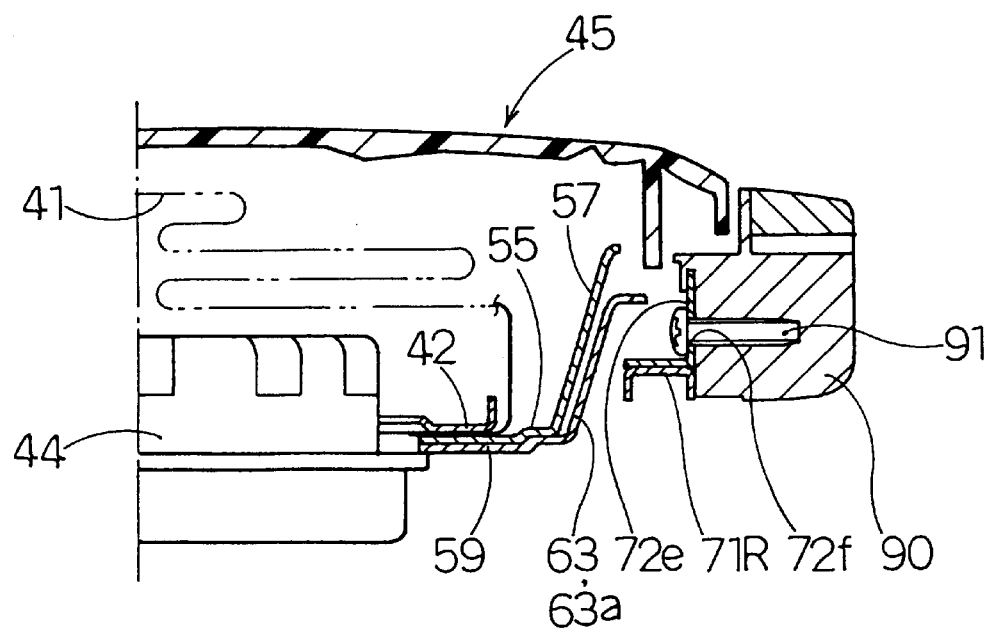
FIG. 12 is a longitudinal section showing the first air bag module and shows a portion XII—XII of FIG. 4.

The air bag 41 and the inflator 44 are retained by the bag holder 54 by making use of the annular retainer 42. This retainer 42 is arranged in the air bag 41. The retainer 42 has four bolts 42a extending downward, as shown in FIGS. 10 and 11. These bolts 42a are inserted into the through holes (not-designated) in the peripheral edge of an opening 41a of the air bag 41, the through holes 56b of the holder plate 55, the through holes 60b of the backup plate 59 and the through holes (not-designated) of the flanged portion 44c of the inflator 44. Then, the nuts 43 are fastened on the individual bolts 42a. As a result, the air bag 41 and the inflator 44 are retained together with the backup plate 59 on the holder plate 55.

On the other hand, the pad 45 is retained by the holder plate 55 and the backup plate 59 in the following manner. First, the individual retaining hooks 57a, 57b, 57c and 57d are inserted and retained in the retaining grooves 47a, 48a, 49a and 50a of the individual side walls 47, 48, 49 and 50 of the pad 45. Moreover, the insertion walls 61 and 62 of the backup plate 59 are inserted into the insertion grooves 47b and 48b of the front and back side walls 47 and 48 of the pad 45. Then, the pad side walls 49 and 50 are retained by the retaining hooks 57c and 57d of the holder plate 55, and the pad side walls 47 and 48 are clamped between the retaining hooks 57a and 57b of the holder plate 55 and the insertion walls 61 and 62 of the backup plate 59. As a result, the pad 45 is retained by the holder plate 55 and the backup plate 59.

Here, when the retaining hooks 57c and 57d of the holder plate 55 are inserted and retained in the retaining grooves 49a and 50a, the individual projections 57e are inserted into the retaining holes 49b and 50b of the individual side walls 49 and 50.

The assembling procedure of the air bag module body 40 is described below. At first, the retainer 42 is inserted from the opening 41a into the air bag 41. The individual bolts 42a protrude from the peripheral edge of the opening 41a. Then, the air bag 41 is folded.

Next, the folded air bag 41 is so confined in the holder plate 55 that the individual bolts 42a may be protruded from the through holes 56b. The air bag 41 is then covered with the pad 45. Then, the individual retaining hooks 57a, 57b, 57c and 57d of the holder plate 55 are inserted and fitted in the retaining grooves 47a, 48a, 49a and 50a of the pad 45.

After this, the backup plate 59 is so arranged under the holder plate 55 that the individual bolts 42a may be projected from the through holes 60b. Then, the insertion walls 61 and 62 are inserted into the insertion grooves 47b and 48b of the front and back side walls 47 and 48 of the pad 45. Moreover, the inflator body 44a is so inserted upward into the insertion holes 60a and 56a of the backup plate 59 and the holder plate 55 that the individual bolts 42a may be protruded from the flanged portion 44c. When the nuts 43 are fastened on the individual bolts 42a, the air bag module body 40 can be assembled.

In this embodiment, a cover 68 of a synthetic resin and the connectors 67 and 85 are attached after the nuts 43 are fastened. The cover 68 is retained on the predetermined bolt 42a so as to protect the connection of the lead wire 66 in the inflator 44. On the other hand, the connectors 67 and 85 are attached to the bracket portion 60c of the backup plate 59.

At the time of assembling the air bag module body 40, the horn switch 70 is assembled in advance with the paired extensions 63b and 64b of the backup plate 59.

The horn switches 70 (70R and 70L) are individually arranged over the right and left mounting seats 26 of the core 22. The horn switches 70 (70R and 70L) are individually constructed, as shown in FIGS. 7, 8, 10 and 27, to include stationary plates 71 (71R and 71L), stationary contact 74, a movable plate 76 (having extensions 63b and 64b), a movable contact 77, a coil spring 79, a support grommet 80, an insulating spacer 81 and a stepped bolt 82. Each of the horn switches 70R and 70L includes one stationary plate 71 (71R or 71L), and two stationary contacts 74, movable plates 76, movable contacts 77, coil springs 79, support grommets 80, insulating spacers 81 and stepped bolts 82.

The individual extensions of the backup plate 59 are employed as the movable plates so that two movable plates 76 are provided for each horn switch 70R or 70L. If the backup plate 59 itself is employed as the movable plate, one movable plate is provided for the two horn switches 70R and 70L.

Figure 21:
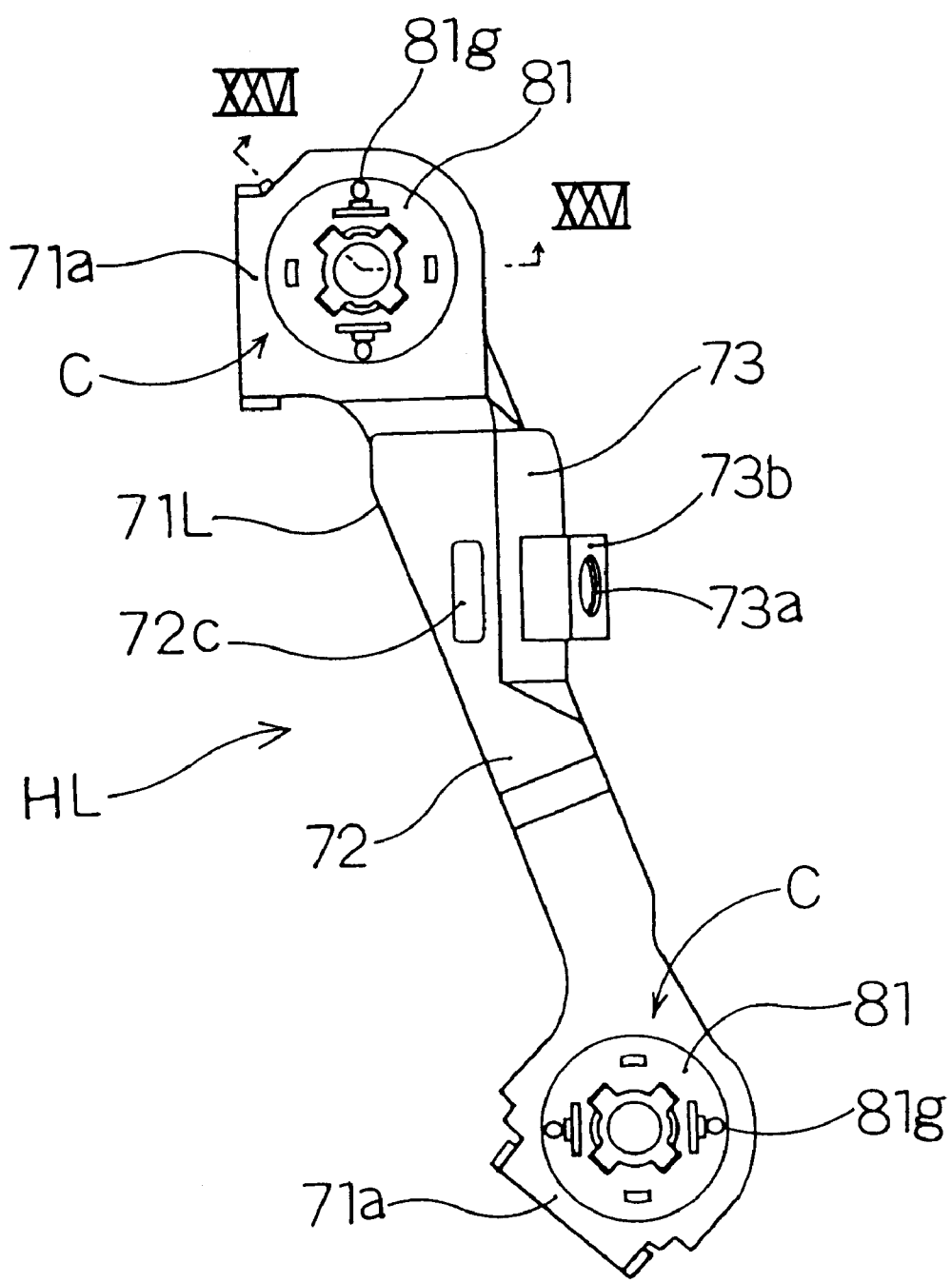
FIG. 21 is a top plan view showing a switch assembly in a lefthand side horn switch of the first embodiment.
Figure 22:
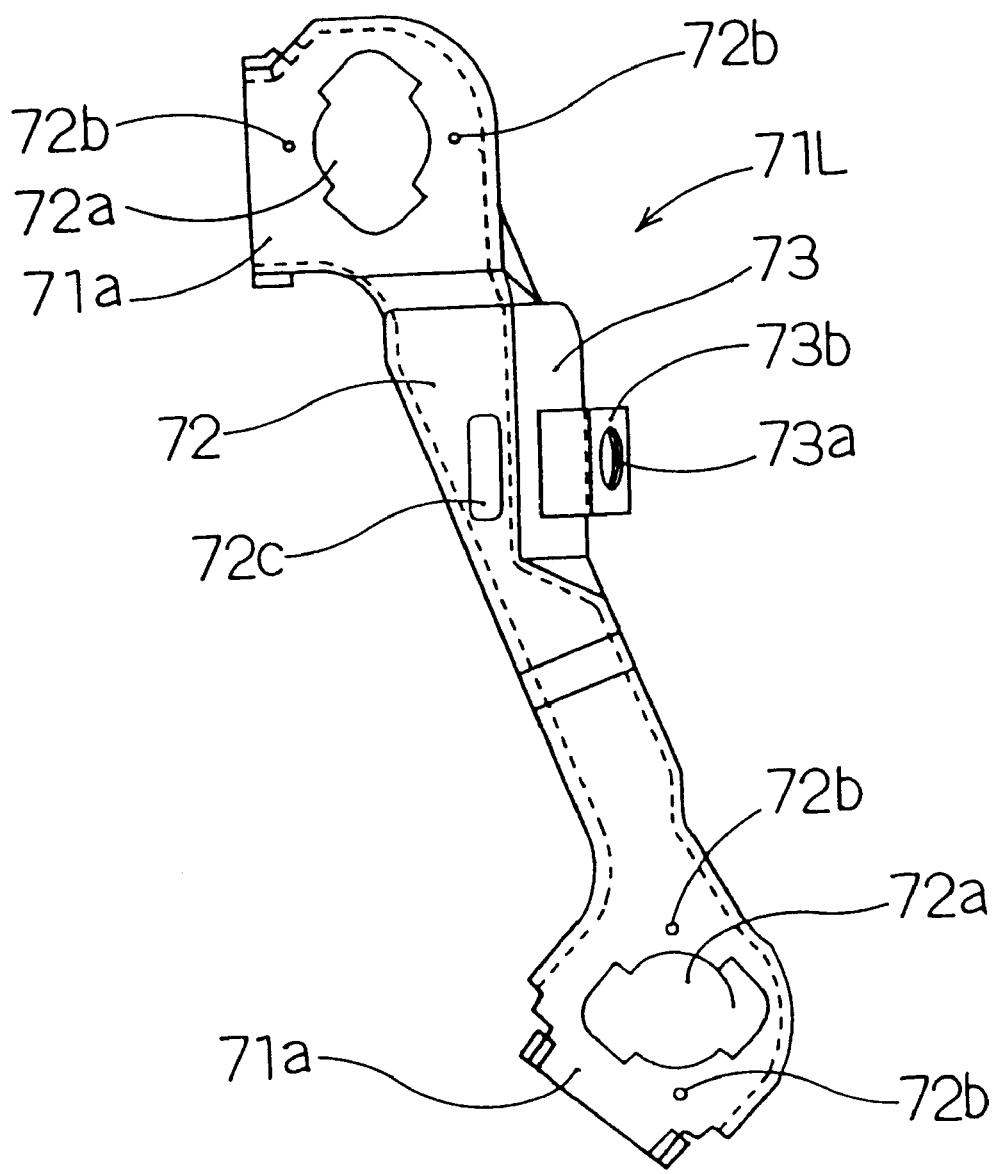
FIG. 22 is a top plan view showing a stationary plate in the lefthand side horn switch of the first embodiment.
Figure 23:
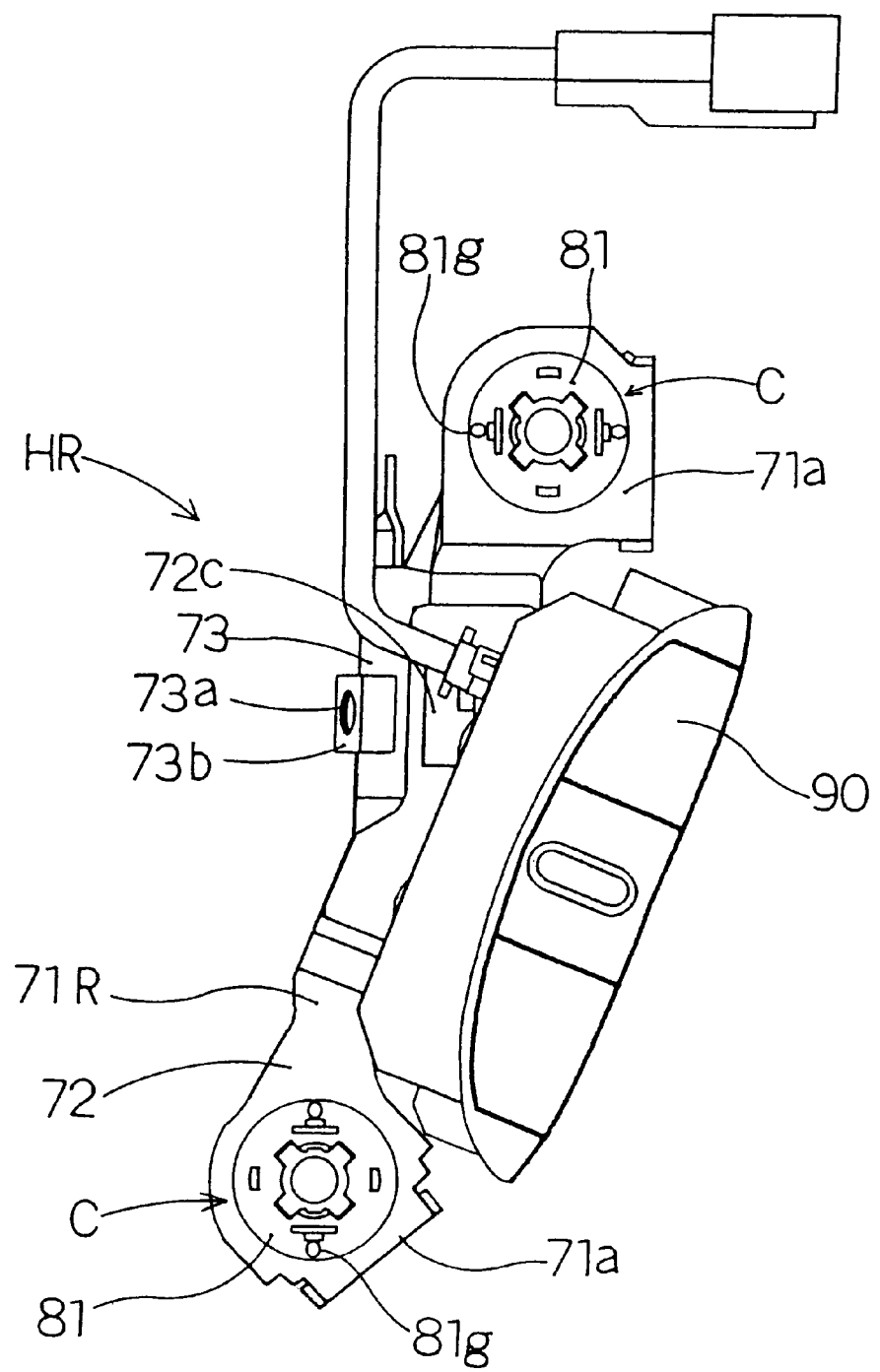
FIG. 23 is a top plan view showing a switch assembly in a righthand side horn switch of the first embodiment.
Figure 24:
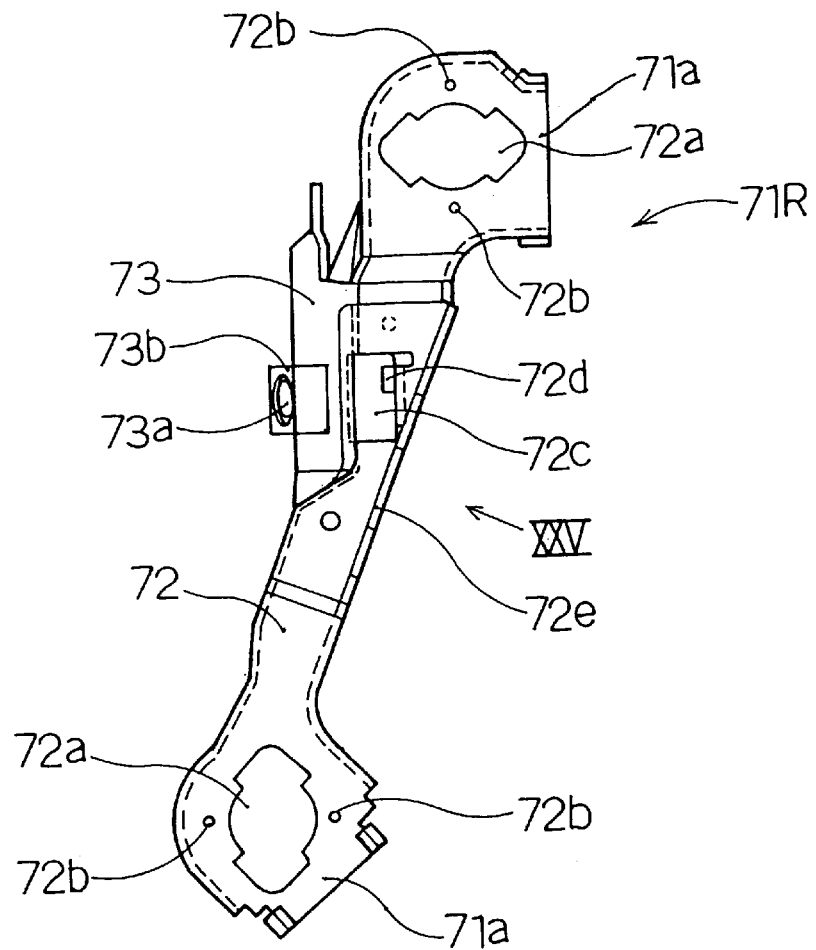
FIG. 24 is a top plan view showing a stationary plate in the righthand side horn switch of the first embodiment.

Moreover, the individual horn switches 70R and 70L enable switch assemblies HR and HL to be temporarily assembled, as shown in FIGS. 21 and 23. These switch assemblies HR and HL are made of the members of the individual horn switches 70R and 70L except the movable plates 76. In the embodiment, moreover, the switch assemblies HR and HL have contact assemblies C to be temporarily assembled. Each of these contact assemblies C is composed of a switch body 70a, a support grommet 80 and the insulating spacer 81. The switch body 70a is composed of the stationary contact 74, the movable contact 77 and the coil spring 79 acting as bias means. The drive monitor switch 90 acting as a function switch is assembled with the stationary plate 71R of the righthand horn switch 70R.

Figure 25:
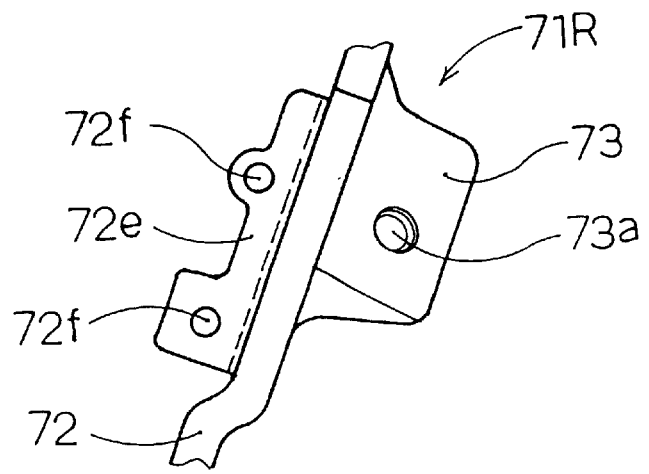
FIG. 25 is a side elevation showing a portion of the stationary plate in the righthand side horn switch of the first embodiment and a view taken in the direction of arrow XXV of FIG. 24.

Each of the stationary plates 71R and 71L is made of a sheet metal, as shown in FIGS. 6, 10, 22 and 24, and is constructed to include a root portion 72 and a mounting portion 73. The root portion 72 is arranged generally in the longitudinal direction of the steering wheel W1. Each mounting portion 73 extends obliquely downward from the inner edge of the substantially intermediate portion in the longitudinal direction of the root portion 72. Moreover, each mounting portion 73 is mounted on the mounting plate 26b of each mounting seat 26 in the steering wheel body 21 by means of the bolts 30. Each mounting portion 73 has a mounting hole 73a to which a nut 73b is welded so that the mounting bolt 30 is driven thereinto. Moreover, each root portion 72 has mounting holes 72a at the two longitudinal ends. The inner peripheral shape of each mounting hole 72a is shaped so that the oblique sides of a generally right triangle is attached to the two edges of a circular hole at symmetric positions. In addition, circular retaining holes 72b of a small diameter are formed at the two sides of the mounting hole 72a. Moreover, each root portion 72 has a retaining hole 72c in a generally intermediate portion in the longitudinal direction. The peripheral edge of the retaining hole 72c retains the retaining clip portion 28g of the holding member 28. The axial direction of each retaining hole 72c is formed substantially vertically so that the air bag module M1 may be in parallel with the axial direction of the boss 24a when it is mounted on the steering wheel body 21. Moreover, the two ends of each root portion 72 provides the abutments 71a at their edges. Each abutment 71a is supported at its lower face by the support portion 25a of the spoke core 25. The righthand stationary plate 71R is provided, as shown in FIGS. 23 and 25, with an upward extending bracket portion 72e at the outer edge of the generally intermediate portion of the root portion 72 in the longitudinal direction. The bracket portion 72e has two mounting holes 72f. In this bracket portion 72e, there is mounted the drive monitor switch 90 by making use of screws 91 to be inserted into the mounting holes 72f. The stationary plate 71R has a hook portion 72d on the peripheral edge of the retaining hole 72c. This hook portion 72d retains the retaining clip portion 28g of the holding member 28.

Figure 26:
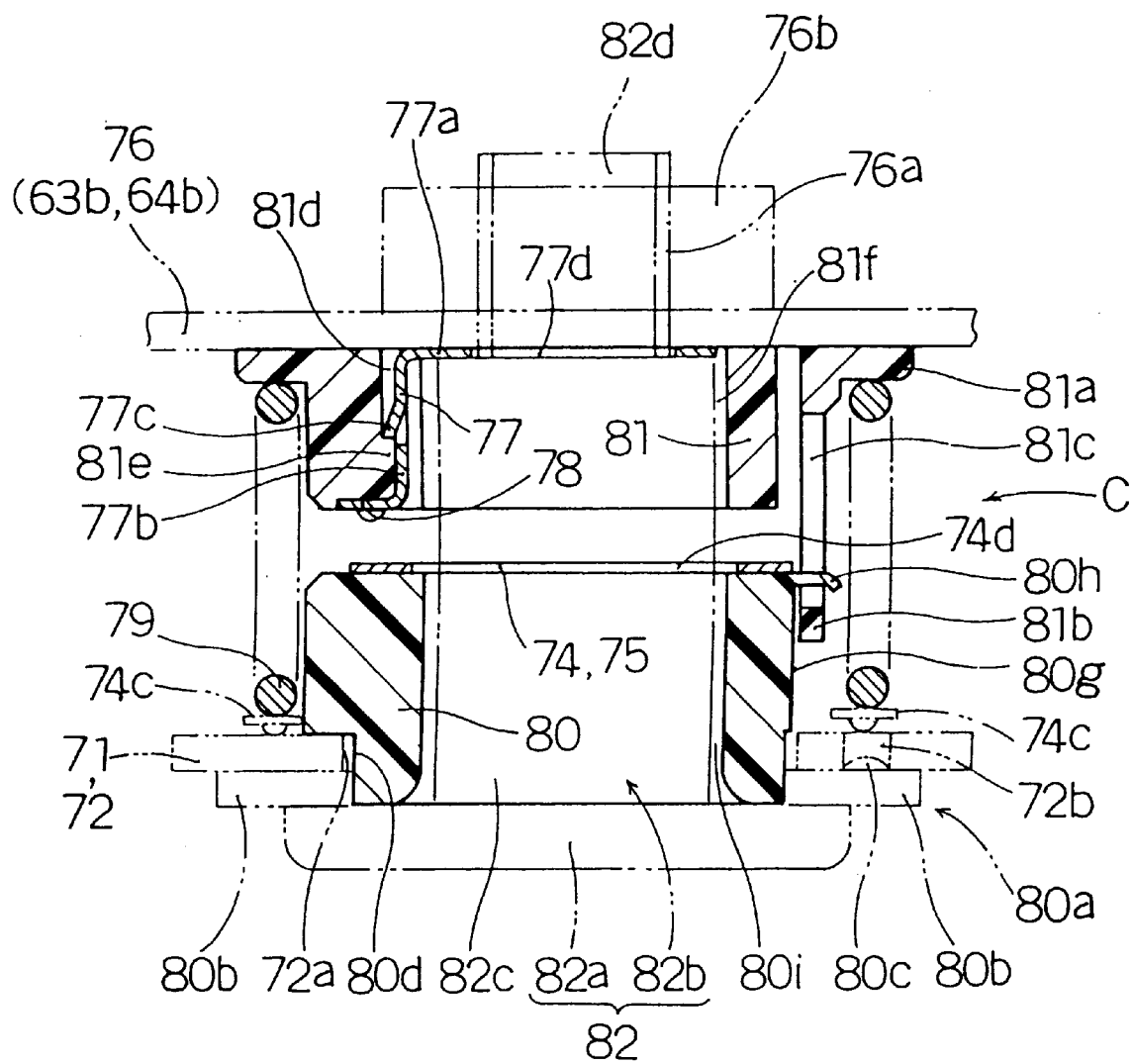
FIG. 26 is a longitudinal section showing a portion of the horn switch of the first embodiment and shows a portion XXVI—XXVI of FIG. 21.
Figure 27:
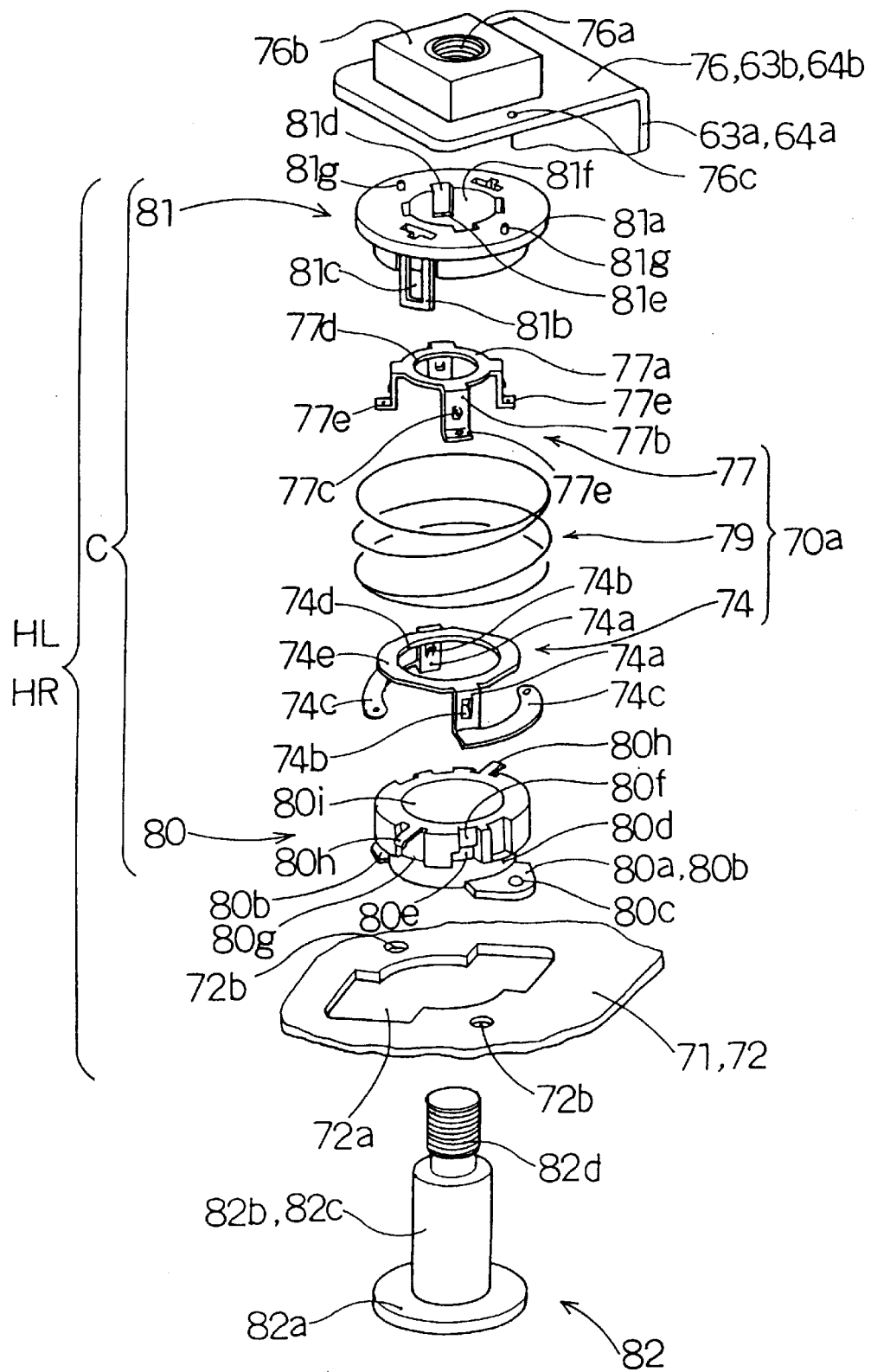
FIG. 27 is an exploded perspective view showing a portion of the horn switch of the first embodiment.

Each movable plate 76 (having the extensions 63b and 64b) has a threaded hole 76a having a nut 76b welded thereto, as shown in FIGS. 19, 26 and 27. The movable plate 76 further has a retaining hole 76c in the circumferential edge of each threaded hole 76a. Into this retaining hole 76c, there is inserted and retained a retaining projection 81g of the later-described insulating spacer 81.

The support grommet 80 is formed into a generally cylindrical shape of an insulating synthetic resin such as polyacetal, as shown in FIGS. 8, 26 and 27, and is provided an insertion hole 80i at its center. Moreover, a bottom portion 80a is shaped to protrude as two retaining plates 80b. This shape matches the opening shape of each mounting hole 72a of the stationary plate 71R or 71L. Each retaining plate 80b has at its upper portion a recess 80d to match the arcuate portion of the inner circumference of the mounting hole 72a. On the upper face of the retaining plate 80b, there is formed a projection 80c. This projection 80c is inserted into the retaining hole 72b. On the other hand, the support grommet 80 has paired recessed 80e and 80g which are vertically formed in the outer circumference at symmetric positions. Retaining steps 80f individually protrude on the inner circumferences of the paired recesses 80e. Each retaining step 80f retains the stationary contact 74 to prevent it from separating upward. This retaining step 80f plays a role to mount the stationary contact 74. In the inner circumferences of the paired recesses 80g, there is slid the ring portion 81b (described below) of the insulating spacer 81. On the inner circumference of each recess 80g, moreover, there is protruded a retaining projection 80h which is bent downward at its leading end. Each retaining projection 80h protrude so as to intersect the axial direction of the insertion hole 80i at a right angle. Moreover, the retaining projection 80h is retained by the circumferential edge of the retaining hole 81c of the ring portion 81b.

The stationary contact 74 is made of spring steel, as shown in FIGS. 8, 26 and 27, and is provided with an annular contact portion 74e having a through hole 74d at its center. When the horn is activated, the contact portion 74e is contacted with a contact portion 77e of the movable contact 77. The stationary contact 74 is provided with two retaining portions 74a and spring portions 74c. The retaining portions 74a extend downward from the symmetrical positions of the outer circumferential edge of the contract portion 74e. Each spring portion 74c is curved from the lower end of each retaining portion 74a and extends radially outward. On the other hand, this retaining portion 74a has a retaining pawl 74b raised at its upper end side and protruded inward. This retaining pawl 74b is retained by the retaining step 80f of the support grommet 80. Each spring portion 74c of the stationary contact 74 acts in the following manner when it is joined in a bayonet to the stationary plate 71R or 71L of the support grommet 80 mounting the stationary contact 74. In other words, each spring portion 74c acts to push the circumferential edge of the mounting hole 72a in the upper face of the root portion 72 of the stationary plate 71R or 71L thereby to force the upper face of each retaining plate 80b into contact with the peripheral edge of the mounting hole 72a in the lower face of the root portion 72. The bayonet joint of the support grommet 80 is performed by inserting each retaining plate 80b into each mounting hole 72a of the stationary plate 71R or 71L and then by turning the support grommet 80 by 90 degrees to insert the projection 80c of each retaining plate 80b into the retaining hole 72b of the stationary plate 71R or 71L.

The contact portion 74e of the stationary contact 74 is arranged, when mounted on the support grommet 80, on the upper end face of the support grommet 80. This mounting operation can be performed by fitting the stationary contact 74 from above the support grommet 80 while inserting each retaining portion 74a into the recess 80e, and by retaining each retaining pawl 74b on the retaining step 80f. On the other hand, the stationary contact 74 is conducted, when the stationary plate 71R and 71R are mounted on the mounting seats 26 of the core 22 by means of the bolts 30, to the negative side of the horn activating circuit through the stationary plate 71 and the core 22.

The insulating spacer 81 is formed into a generally cylindrical shape of an insulating synthetic resin such as polyacetal and has an insertion hole 81f at its center, as shown in FIGS. 8, 26 and 27. The insulating spacer 81 is constructed to include a spring seat 81a and the two ring portions 81b. The spring seat 81a forms an upper outer circumference of the insulating spacer 81 and is protruded in a flange shape. The individual ring portions 81b protrude downward from the near symmetric positions of the spring seat 81a and individually have retaining holes 81c. The insulating spacer 81 is provided at four portions of the inner circumference of the insertion hole 81f with recesses 81d extending vertically. Each ring portion 81b retains the retaining projection 80h of the support grommet 80 on the peripheral edge of the retaining hole 81c, as described hereinbefore. Each ring portion 81b is formed to have such a length that the peripheral edge of the retaining hole 81c may not interfere with the retaining projection 80h even if the insulating spacer 81 is brought close to the support grommet 80 to activate the horn. On the other hand, each recess 81d has a retaining step 81e on its inner periphery. Each retaining step 81e retains the movable contact 77 to prevent it from separating downward. Each retaining step 81e plays a role to mount the movable contact 77. At the symmetric positions of the upper end face, moreover, there are formed the retaining projections 81g which protrude upward to be inserted and retained in the retaining holes 76c of the movable plate 76.

The movable contact 77 is made of spring steel, as shown in FIGS. 8, 26 and 27, and is constructed to include a root portion 77a, retaining portions 77b and contact portions 77e. The root portion 77a is formed into an annular shape having an insertion hole 77d at its center. The retaining portions 77b extend downward from four portions of the outer circumferential edges of the root portion 77a. The contact portions 77e extend outward from the lower ends of the individual retaining portions 77b. Each contact portion 77e comes into contact with the contact portion 74e of the stationary contact 74 when the horn is activated. Each retaining portion 77b has a retaining pawl 77c protruding outward at its lower end. Each retaining pawl 77c is retained by the retaining step 81e of the insulating spacer 81.

Each contact portion 77e is arranged on the lower end face of the insulating spacer 81 when the movable contact 77 is mounted on the insulating spacer 81. When the movable contact 77 is to be mounted on the insulating spacer 81, the individual retaining portions 77b are inserted upward into the recesses 81d, and the individual retaining pawls 77c of the movable contact 77 are retained on the retaining steps 81e of the insulating spacer 81.

The coil spring 79 forms the bias means for biasing the movable contact 77 upward. The coil spring 79 is arranged in an insulated manner between the stationary plate 71 and the movable plate 76. The coil spring 79 has appropriately sized internal and external diameters to abut against the spring portion 74c of the stationary contact 74 and the spring seat 81a of the insulating spacer 81.

The stepped bolt 82 constructs regulate means for allowing the downward movement of the movable plate 76 to regulate the spacing of the movable plate 76 from the stationary plate 71. Moreover, the stepped bolt 82 is constructed to include a head 82a formed at its lower end and a stem 82b extended upward from the heat 82a. The stem 82b is composed of a column-shaped diametrically larger portion 82c at the lower side and a diametrically smaller portion 82d. This diametrically smaller portion 82d has a smaller diameter than that of the diametrically larger portion 82c and extends upward from the same and is externally threaded to be fastened into the threaded hole 76a of the movable plate 76. In the stepped bolt 82 of the embodiment, the diametrically larger portion 82c is inserted upward into the mounting hole 72a of the stationary plate 71 until the head 82a abuts against the peripheral edge of the mounting hole 72a. However, the step bolt 82 has to be insulated from the stationary plate 71 because it is screwed in the movable plate 76. Thus, the head 82a is held in abutment against the peripheral edge of the mounting hole 72a while interposing the retaining plate 80b of the bottom 80a of the support grommet 80. Moreover, the diametrically larger portion 82c has an external diameter so that it can be inserted into the insertion holes 80i, 74d and 81f of the support grommet 80, the stationary contact 74 and the insulating spacer 81 but not into the insertion hole 77d of the movable contact 77. On the other hand, the diametrically smaller portion 82d has such an external diameter that it can be inserted into the insertion hole 77d of the movable contact 77 and screwed in the threaded hole 76a.

The diametrically larger portion 82c of the stem 82b of the stepped bolt 82 has a predetermined length. Thus, the diametrically larger portion 82c defines the spacing between the stationary plate 71 and the movable plate 76 and defines the stroke of operating the horn switch 70.

The assembling procedures of the switch assemblies HR and HL is described below. First, the retaining pawls 74b are retained on the retaining step 80f while inserting the retaining portions 74a downward into the recesses 80e, and the corresponding stationary contacts 74 are fitted on each support grommet 80. Moreover, the retaining portions 77b are inserted upward into the recesses 81d, and the retaining pawls 77c are retained on the retaining step 81e to fit the corresponding movable contact 77 on each insulating spacer 81.

The support grommet 80 and the insulating spacer 81 are moved closer to each other while interposing the coil spring 79 so that the lower end of the coil spring 79 may abut against the individual spring portions 74c of the stationary contact 74 whereas the upper end of the coil spring 79 may abut against the spring seat 81a of the insulating spacer 81. Next, the individual ring portions 81b are inserted into the recesses 80g and are warped to retain the individual retaining projections 80h on the peripheral edges of the retaining holes 81c. Thus, the contact assembly C can be made.

Moreover, the contact assembly C thus made can be assembled with the stationary plates 71R and 71L to make the switch assemblies HR and HL. The contact assemblies C are combined with the stationary plates 71R and 71L by joining the bottoms 80a of the support grommets 80 in the bayonet manner to the individual mounting holes 72a in the root portions 72 of the stationary plates 71R and 71L.

The drive monitor switch 90 is attached in advance to the bracket portion 72e by means of the screws 91.

When the support grommets 80 are subjected to the bayonet joint, the individual stationary contacts 74 are supported by the stationary plates 71R and 71L.

If the air bag module body 40 is assembled in advance, the air bag module M1 can be easily assembled by the following procedures. The insertion holes 77d of the movable contacts 77 of the individual switch assemblies HR and HL are arranged with the threaded holes 76a of the predetermined movable plate 76 of the air bag module body 40, and the individual retaining projections 81g of the insulating spacer 81 are fitted in the retaining holes 76c of the movable plate 76. Next, the stepped bolts 82 are inserted upward into the insertion holes 80i, 74d, 81f and 77d of the individual switch assemblies HR and HL and are screwed into the threaded holes 76a of the movable plate 76. Then, the individual horn switches 70R and 70L can be assembled, and the horn switches 70R and 70L and the drive monitor switch 90 can be assembled with the backup plate 59 of the air bag module body 40, so that the air bag module M1 can be assembled.

When the stepped bolts 82 are inserted into the insertion holes 80i, 74d, 81f and 77d of the individual switch assemblies HR and HL and screwed into the threaded holes 76a of the movable plate 76, the root portions 77a of the circumferential edges of the insertion holes 77d of the movable contact 77 are forced to contact the circumferential edges of the threaded holes 76a by the upper surface of the diametrically larger portion 82c. At this time, the individual movable contacts 77 are supported by the extensions 63b and 64b (of the movable plate 76).

The air bag module M1 is attached, after being assembled, to the steering wheel body 21 to assemble the steering wheel W1. When the steering wheel W1 is assembled, the boss 24a of the boss core 24 is connected in advance to the steering shaft of the vehicle.

For assembly, the predetermined connectors 36, 67 and 85 and the not-shown connectors are coupled at first to each other. As shown in FIG. 15, the air bag module M1 descends from above the steering wheel body 21. While the lower faces of the individual abutments 71a of the stationary plates 71R and 71L are being supported in abutment against the upper faces of the support portions 25a of the individual spoke cores 25 of the steering wheel body 21, the individual mounting portions 73 of the stationary plates 71R and 71L are applied to the mounting plates 26b of the right and left mounting seats 26 of the steering wheel body 21. Moreover, the air bag module M1 is temporarily mounted on the steering wheel body 21. Specifically, the retaining pawls 28e of the individual holding members 28, as fixed on the steering wheel body 21 by means of the screws 29, are inserted and retained on the peripheral edges (especially on the hook portions 72d on the peripheral edges of the retaining holes 72c of the righthand stationary plate 71R) of the retaining holes 72c of the stationary plates 71R and 71L of the air bag module M1.

This temporary mounting state is established at the right and left sides of the air bag module M1, individually, by one retaining pawl 28e. However, the air bag module M1 in this temporary mounting state is supported in abutment at its right and left sides by the individual support portions 25a of the four spoke cores 25 arranged at the front and back portions. The supporting abutting portions are the abutments 71a which are located at two longitudinal portions of the temporary mounting portion (i.e., the peripheral edges of the retaining holes 72c). Moreover, the air bag module M1 is supported in abutment at the front and back portions of the right and left sides so that it is temporarily mounted stably without any rotation.

In this temporary mounting state, moreover, the boss 24a of the boss core 24 of the steering wheel body 21 is connected to the steering shaft. As a result, the axial direction of the boss 24a of the steering wheel body 21 is inclined backward at its upper portion. As a matter of fact, therefore, the individual mounting seats 26 are inclined downward at their back sides. However, the individual retaining holes 72c are formed generally vertically in parallel with the axial direction of the boss 24a. As a result, the air bag module M1 is temporarily mounted on the steering wheel body 21 without being offset from the individual mounting seats 26 by the retaining pawls 28e inserted into the individual retaining holes 72c.

After the air bag module M1 was temporarily mounted, moreover, the mounting bolts 30, as held in the holding members 28 mounted on the individual mounting seats 26 by the screws 29, are removed from the hook portions 28b of the individual holding members 28. Next, the mounting bolts 30 are screwed through the mounting holes 26c of the individual mounting plates 26b into the mounting holes 73a of the mounting portions 73 of the stationary plates 71R and 71L. Then, the air bag module M1 can be mounted on the steering wheel body 21 to assemble the steering wheel W1.

At the time of assembling the steering wheel W1, the movable contacts 77 of the individual horn switches 70R and 70L are conducted to the positive terminal of the horn activating circuit through the lead wire 84 and the connector 85, as connected with the backup plate 59. On the other hand, the stationary contacts 74 of the individual horn switches 70R and 70L are conducted to the negative terminal of the horn activating circuit through the spring portions 74c of the stationary contacts 74, the stationary plates 71 R and 71L and the core 22.

In the assembled steering wheel W1, the air bag 41 is inflated when the inflating gas is discharged from the gas exit 44b of the inflator 44. Then, the air bag 41 is largely inflated by rupturing the ceiling portion 46 of the pad 45.

In the horn switches 70 of the embodiment, the pad 45 is pushed to depress the air bag module body 40. Then, the movable plates 76 are brought closer to the stationary plates 72 against the biasing forces of the coil springs 79. The contact portions 77e of the movable contacts 77 come into contact with the contact portions 74e of the stationary contacts 74 to activate the horn. Here, the stationary contacts 74 are supported by the stationary plate 71 through the support grommets 80 and the stepped bolts 82. The movable contacts 77 are supported by the movable plates 76 through the insulating spacers 81 and the diametrically larger portions 82c of the stepped bolts 82.

In the horn switches 70 of the embodiment, as shown in FIG. 4, each switch body 70a is arranged under the adjacent peripheral edge 46a of the pad ceiling portion 46. Each adjacent peripheral edge portion 46a is formed close to the cover layer 27 in the spoke portion S of the steering wheel body 21. In short, each adjacent peripheral edge 46a is formed to extend along each spoke portion S. As a result, each switch body 70a is arranged far closer to the peripheral edge of the pad 45 than each switch body 5a of a horn switch 5 of the prior art.

When the peripheral edge of the pad 45 in the vicinity of the cover layer 27 is depressed, the coil spring 79 of the switch body 70a in the vicinity can be compressed to minimize the compression of the adjoining coil spring 79. Moreover, the movable contact 77 of the switch body 70a can be brought into contact with the stationary contact 74. As a result, the horn switch 70 of the embodiment can suppress the operation load to withstand one coil spring 79. In short, the horn switch 70 of the embodiment can reduce the operation load.

Moreover, the individual adjacent peripheral edges 46a are arranged over the movable contacts 77 and are provided with the push ribs 51 as push portions protruding downward. These push ribs 51 are to abut against the extensions 63b and 64b supporting the movable contact 77. Moreover, the stationary contacts 74, as arranged under the individual movable contacts 77, are supported by the stationary plates 71 which are supported in abutment by the individual spoke cores 25 in the vicinity of the individual stationary contacts 74. As a result, the individual stationary contacts 74 are arranged so that they are prevented as much as possible from moving downward.

When the pad 45 is depressed at its peripheral edge, the push ribs 51 of the adjacent peripheral edges 46a push the movable contacts 77 of the predetermined switch bodies 70a directly into contact with the stationary contacts 74 through the extensions 63b and 64b of the bag holder 54. Moreover, the stationary contacts 74 are prevented as much as possible from moving downward. Thus, after the movable contacts 77 come into contact with the stationary contacts 74, the push ribs 51 will not move downward. As a result, a clear feel when the switch arrives at the bottom can be obtained when the pad 45 is depressed at its peripheral edge.

In the horn switches 70 of the embodiment, therefore, at the time the peripheral edge of the pad 45 is depressed in the air bag module M1, it is possible to reduce the operation load and to retain the clear feel of arrival at the bottom. This makes it possible to improve the operation feel of the horn switches 70.

The bag holder 54 is constructed to include the holder plate 55 and the backup plate 59. As a result, the pad 45 of the air bag module M1 can be retained with a small number of parts without employing any rivet. Moreover, the backup plate 59 can be arranged outside of the holder plate 55 if it is provided with the extensions 63b and 64b for supporting the movable contacts 77. In other words, the switch bodies 70a are kept away from interfering with the holder plate 55 even if the switch bodies 70*a* including the movable contacts 77 are mounted on the extensions 63*b* and 64*b*. This enables the pad 45 to be held on the holder plate 55 and the backup plate 59. In short, assembling the air bag module M1 is easily facilitated.

Here in the embodiment, at the time of assembling the air bag module body 40, the horn switches 70 are assembled in advance with the backup plate 59. Alternatively, however, the switch assemblies HR and HL may be assembled with the air bag module body 40, as already assembled, and the horn switches 70 may then be assembled with the air bag module body 40. In this modification, it is still possible to retain the excellent operation feel of the horn switches 70.

In the steering wheel W1 of the embodiment, moreover, the stationary and movable contacts 74 and 77, the support grommets 80, the insulating spacers 81 and the coil springs 79 can be assembled as the contact assemblies C for the individual switch bodies 70*a*. These parts can be prevented from being lost by handling them as the contact assemblies C. This makes it easy to assemble the horn switches 70R and 70L.

Moreover, the embodiment is exemplified by the construction in which the bag holder 54 includes the two members, i.e., the holder plate 55 and the backup plate 59. When the pad 45 is riveted, however, the bag holder 54 can be constructed by one member. In this modification, the operation feel of the horn switches can be improved if the bag holder itself is equipped with such an extension as is extended to the push portion (e.g., the push rib 51) of the pad 45 so that it can support the movable contact.

The embodiment is further exemplified by the construction in which the extensions 63*b* and 64*b* for supporting the movable contacts 77 are made integral with the backup plate 59 at the side of the bag holder 54. However, the extensions may be mounted separately of the members at the bag holder side by means of bolts, rivets or welds. Using this modification, it is still possible to retain a satisfactory operational feel of the horn switches.

In the steering wheel W1 of the embodiment, the horn switches 70R and 70L themselves are assembled with the air bag module body 40 when the air bag module M1 is to be assembled. With the stationary plate 71R or the component of the righthand horn switch 70R, on the other hand, there is assembled in advance the drive monitor switch 90 as the function switch.

In the embodiment, more specifically, neither the horn switches nor the drive monitor switch is not directly attached to the large parts of the steering wheel body 21. In other words, in the embodiment, the drive monitor switch 90 is assembled with the stationary plate 71R or the component of the horn switch 70R. This assembly is made by joining the small parts. In the embodiment, moreover, the horn switches 70R and 70L are assembled with the air bag module body 40. Thus, the horn switches 70R and 70L are assembled with the air bag module body 40 or a part smaller than the steering wheel body 21.

When assembling these two kinds of steering wheels, it is easy to move or turn the parts such as the stationary plate 71R of the horn switch 70R, the air bag module body 40 and the monitor switch 90. This makes it easy to assemble the horn switches 70R and 70L and the monitor switch 90. Moreover, assembling these two kinds of steering wheels require the assembly of small parts with each other. As a result, the screws 91 and the bolts 82 to be used for the assembling works can be visually found out with ease even if they are lost.

As a result, it is easy to manage the parts such as the screws 91 and the bolts 82 and to assemble the horn switches 70R and 70L and the monitor switch 90 thereby to assemble the steering wheel W1 simply.

At a time of assembling the horn switches 70R and 70L, the movable plate 76 is attached at first to the air bag module body 40. The switch assemblies HR and HL, as assembled with the contact assembly C and the monitor switch 90, are so formed on the stationary plates 71R and 71L that the stationary contact 74, the movable contact 77 and the coil spring 79 may be interposed between the movable plate 76 and the stationary plate 71. After this, those switch assemblies HR and HL are arranged under the movable plate 76. Then, the stepped bolts 82 are screwed from the lower face of the stationary side plate 71 into the threaded holes 76*a* of the movable plate 76 through the mounting holes 72*a*. At this time, the heads 82*a* of the stepped bolts 82 are brought into abutment against the peripheral edges of the mounting holes 72*a* of the stationary plate 71 while interposing the support grommets 80. Moreover, the end faces of the diametrically larger portion 82*c* are brought into abutment against the circumferential edges of the threaded holes 76*a* while interposing the root portions 77*a* of the movable contacts 77. Then, the horn switches 70R and 70L and the monitor switch 90 are assembled with the air bag module body 40.

In short, the horn switches 70R and 70L can be assembled by screwing the stepped bolts 82 into the threaded holes 76*a* of the movable plate 76. At the same time, the horn switches 70R and 70L can be assembled with the air bag module body 40.

As a result, the stepped bolts 82 can serve to assemble the horn switches 70R and 70L themselves and to assemble them with the air bag module body 40. Thus, the stepped bolts 82 can reduce the number of parts composing the air bag module M1 and the number of steps of assembling the air bag module M1.

In the embodiment, the drive monitor switch 90 is exemplified as the function switch to be assembled with the air bag module M1. However, the function switch may be any switch other than the horn switch 70 if it can be assembled with the air bag module M1. For example, the function switch may be exemplified by the constant-speed device switch 33 which is attached to the steering wheel body 21. In this modification, the constant-speed switch 33 may be attached to the stationary plate 71 or the like constructing the horn switches 70. In this modification, it is still simple to assemble the steering wheel W1.

In the embodiment, moreover, for assembling the air bag module M1, the module body 40 is assembled in advance, and the switch assemblies HR and HL are assembled with that body 40. However, the switch assemblies HR and HL may be assembled in advance with the backup plate 59, so that the module M1 may be assembled while the module body 40 is being assembled. Using this modification, it is still simple to assemble the steering wheel W1.

In the steering wheel W1 of the present embodiment, the member for mounting the air bag module M1 temporarily is exemplified by the retaining pawl 28*e*. This retaining pawl 28*e* is extended from each holding member 28 holding the mounting bolt 30. This retaining pawl 28*e* corresponds to the retaining hole 72*c* which is formed at each of the right and left sides of the air bag module M1. This makes the temporary mounting members from becoming bulky. This can enlarge the effective space in the steering wheel W1. Moreover, the retaining pawls 28*e* can be formed merely by integrating them with an existing holding member 12. This hardly raises the cost for materials even if the retaining pawls 28e are formed. As a result, it is possible to lower the cost for manufacturing the steering wheel W1.

Moreover, the temporary mounted state of the air bag module M1 is established by one retaining pawl 28e at each of the right and left sides of the air bag module M1. However, the temporarily mounted air bag module M1 is supported in abutment at the individual right and left sides by the individual support portions 25a of the four spoke cores 25 arranged at the front and back of the right and left sides. The portions to be supported in abutment are the two abutments 71a at the individual front and back sides of the temporary mounted portions (i.e., the peripheral edges of the retaining holes 72c). The air bag module M1 is temporarily mounted in a stable manner without any turn because it is supported in abutment at the front and back of the right and left sides.

In the steering wheel W1 of the embodiment, therefore, the air bag module M1 can be temporarily mounted in a stable manner with respect to the steering wheel body 21. Moreover, the space for the means for mounting the air bag module M1 temporarily can be minimized to widen the effective space in the steering wheel W1. It is further possible to lower the production cost.

In the steering wheel W1 of the embodiment, on the other hand, the two horn switches 70R and 70L are assembled with the air bag module M1. Moreover, the stationary plates 71R and 71L for supporting those stationary contacts 74 are constructed to include: the retaining holes 72c to be retained by the retaining pawls 28e of the holding members 28; the mounting portions 73 for screwing the stepped bolts 30; and the abutments 71a to be supported by the support portions 25a of the individual spoke cores 25. In the steering wheel W1 of the present embodiment, the two horn switches 70R and 70L are attached in advance to the air bag module M1. This makes it possible to arrange the horn switches 70R and 70L on the steering wheel W1 merely by attaching the air bag module M1 to the steering wheel body 21. This makes it easy to assemble the plural horn switches 70R and 70L with the steering wheel W1.

In the embodiment, the air bag module M1 is provided with the two horn switches 70R and 70L. It is, however, possible to provide more horn switches.

In the embodiment, on the other hand, the horn switches 70R and 70L are assembled with the air bag module M1, and the retaining holes 72c for retaining the retaining pawls 28e of the holding member 28 are formed in the stationary plate 71. When the horn switches are mounted on the spoke portions 25 at the side of the steering wheel body 21, however, the retaining holes corresponding to the retaining pawls 28e and 28e and the mounting holes corresponding to the mounting bolts 30 and 30 may be formed in the backup plate 59 or the like.

What is claimed is:

1. A steering wheel comprising:
   a steering wheel body; and
   an air bag module;
   wherein said steering wheel body includes:
      an annular ring portion;
      a boss portion at the center of said ring portion;
      a plurality of spoke portions for joining said boss portion and said ring portion;
      a core for joining said ring portion, said boss portion and said spoke portions; and
      a cover layer for covering said ring portion in said core and said spoke portions in the vicinity of said ring portion in said core;
   wherein said air bag module is arranged in said steering wheel body over said boss portion and includes:
      an air bag module body; and
      a horn switch;
   wherein said air bag module body includes:
      a folded air bag;
      an inflator for feeding said air bag with an inflating gas;
      a pad having a ceiling portion covering said folded air bag and side walls extended downward from a peripheral edge of said ceiling portion; and
      a bag holder for holding said air bag, said inflator and said pad;
   wherein the ceiling portion of said pad has adjacent peripheral edges extend along said spoke portions individually so as to be positioned closer to the cover layer at the individual spoke portions of said steering wheel body;
   wherein each of said adjacent peripheral edges has a push portion protruding downward;
   wherein said bag holder has extensions extending under the individual push portions of said pad as to abut against the individual push portions;
   wherein said horn switch is operated by depressing said pad and includes:
      a switch body; and
      a stationary plate supporting and abutting against the core of each of said spoke portions;
   wherein a plurality of said switch bodies between said air bag module body and said steering wheel body and includes:
      a stationary contact;
      a movable contact for activating a horn when it contacts with said stationary contact; and
      bias means for biasing said movable contact upward to move the movable contact apart from said stationary contact when inactive;
   wherein each of said switch bodies is arranged under said push portion;
   wherein the movable contacts of said individual switch bodies are supported by said extensions;
   wherein said stationary plates are supported by and abut the cores of the individual spoke portions in the vicinity of the individual stationary contacts; and
   wherein the stationary contacts of said individual switch bodies are supported by said stationary plates.

2. A steering wheel according to claim 1,
   wherein said pad includes:
      retaining grooves formed in an inner periphery of said side walls; and
      insertion grooves formed in the lower end faces of said side walls under said retaining grooves;
   wherein said bag holder includes:
      a holder plate having a retaining hook to be retained on the peripheral edges of said retaining grooves; and
      a backup plate arranged under said holder plate and having an insertion wall to be inserted into said insertion grooves for clamping and holding said pad side walls between itself and said bag holder; and
   wherein said extensions are formed on said backup plate.

3. A steering wheel, comprising:
   a steering wheel body; and
   an air bag module,
   wherein said air bag module is mounted on said steering wheel body and includes:

an air bag module body;
a horn switch; and
a function switch,
wherein said horn switch is assembled with said air bag module body before being assembled with said steering wheel body,
wherein said function switch is assembled with a component of said horn switch before being assembled with said air bag module body,
wherein said horn switch includes:
  a stationary plate adapted to be mounted on said steering wheel body and to assemble said function switch, said stationary plate supporting a stationary contact;
  a movable plate arranged over said stationary plate and adapted to be mounted on said air bag module body, for supporting a movable contact corresponding to said stationary contact;
  bias means arranged between said stationary plate and said movable plate, for biasing said movable plate upward; and
  regulate means for regulating the spacing of said movable plate from said stationary plate, by allowing said movable plate to move downward,
wherein said regulate means includes a stepped bolt, said stepped bolt including:
  a head having a larger diameter than that of a mounting hole formed in said stationary plate; and
  a stem extended upward from said head and adapted to be inserted into said mounting hole,
wherein said stem includes:
  a diametrically larger portion at a lower side; and
  a diametrically smaller portion extended upward with a smaller diameter than that of said diametrically larger portion and externally threaded to be screwed in a threaded hole formed in said movable plate,
wherein at a time of assembling said horn switch, said movable plate is mounted on said air bag module body, and said stationary plate, as assembled with said function switch, is arranged under said movable plate while interposing said stationary contact, said movable contact and said bias means between said stationary plate and said movable plate, and
wherein said stepped bolt is screwed from the lower face of said stationary plate through said mounting hole into the threaded hole of said movable plate, to bring said head into abutment against the peripheral edge of said mounting hole and the end face of said diametrically larger portion into abutment against the peripheral edge of said threaded hole thereby to assemble said horn switch and said function switch with said air bag module body.

4. A steering wheel comprising:
a steering wheel body;
and an air bag module;

wherein said steering wheel body includes:
  a center boss portion;
    four spoke portions arranged at a front, back right and left sides of said steering wheel body; and
    mounting seats individually arranged between said spoke portions at the front, back, of the right and left sides and adapted to be individually brought into abutment against right and left side face portions of said air bag module;
wherein holding members are individually mounted on said mounting seats;
wherein mounting bolts for mounting said air bag module on the mounting seats of said steering wheel body are individually held in said holding members;
wherein said air bag module has one retaining hole in the vicinity of the screwing portion of each of said mounting bolts;
wherein said individual holding members have retaining pawls to be retained on the peripheral edges of the corresponding retaining holes;
wherein cores of said individual spoke portions have support portions for supporting the lower face of said air bag module; and
wherein when said air bag module is to be mounted in said steering wheel body over said boss portion, said air bag module is arranged at said individual mounting seats while being supported by the individual support portions of said individual spoke portions, and said individual retaining pawls are retained on the peripheral edges of the corresponding retaining holes, so that said air bag module is temporarily mounted on said steering wheel body.

5. A steering wheel according to claim 4,
wherein said air bag module is assembled with a plurality of horn switches;
wherein each of said horn switches includes:
  a stationary plate for supporting a stationary contact;
  a movable plate arranged over said stationary plate and adapted to be mounted on an air bag module body, said movable plate supporting the movable contact corresponding to said stationary contact;
  bias means arranged between said stationary plate and said movable plate for urging said movable plate upward; and
  regulate means for regulating the spacing of said movable plate from said stationary plate by allowing said movable plate to move downward; and
wherein said stationary plate includes:
  said retaining holes;
  mounting portions adapted to be fixed on said mounting seats by screwing said mounting bolts; and
  abutments adapted to be supported by the support portions of said spoke portions.

* * * * *